US00RE45770E

(19) United States
(12) Reissued Patent
Flinn et al.

(10) Patent Number: US RE45,770 E
(45) Date of Reissued Patent: Oct. 20, 2015

(54) ADAPTIVE RECOMMENDATION EXPLANATIONS

(71) Applicant: World Assets Consulting AG, LLC, Wilmington, DE (US)

(72) Inventors: Steven Dennis Flinn, Sugar Land, TX (US); Naomi Felina Moneypenny, Houston, TX (US)

(73) Assignee: WORLD ASSETS CONSULTING AG, LLC, Wilmington, DE (US)

(21) Appl. No.: 13/727,380

(22) Filed: Dec. 26, 2012

Related U.S. Patent Documents

Reissue of:
(64) Patent No.: 7,860,811
Issued: Dec. 28, 2010
Appl. No.: 12/139,486
Filed: Jun. 15, 2008

U.S. Applications:
(63) Continuation-in-part of application No. 11/419,554, filed on May 22, 2006, now Pat. No. 7,539,652, which is a continuation of application No. PCT/US2004/037176, filed on Nov. 4, 2004.

(60) Provisional application No. 60/944,516, filed on Jun. 17, 2007, provisional application No. 61/054,141, filed on May 17, 2008, provisional application No. 60/525,120, filed on Nov. 28, 2003.

(51) Int. Cl.
*G06F 17/20* (2006.01)
*G06Q 30/06* (2012.01)
*G06Q 30/02* (2012.01)

(52) U.S. Cl.
CPC ..... *G06Q 30/0631* (2013.01); *G06Q 30/0255* (2013.01)

(58) Field of Classification Search
None
See application file for complete search history.

(56) References Cited

U.S. PATENT DOCUMENTS 5,099,426 A 3/1992 Carlgren et al.
5,132,915 A 7/1992 Goodman (Continued)

FOREIGN PATENT DOCUMENTS

EP 1311980 5/2003
EP 1397252 5/2005

(Continued)

OTHER PUBLICATIONS

Tintarev, Nava et al.; "A Survey of Explanations in Recommender Systems"; IEEE; 2007 IEEE 23rd International Conference on Data Engineering Workshop; pp. 801-810.*

(Continued)

*Primary Examiner* — Stanley K Hill
(74) *Attorney, Agent, or Firm* — Schwabe Williamson & Wyatt

(57) ABSTRACT

A method and system for generating adaptive explanations for associated recommendations is disclosed. The adaptive explanations comprise a syntactical structure and associated phrases that are selected in accordance with usage behaviors and/or inferences associated with usage behaviors. The phrases included in an adaptive explanation may be selected through application of a non-deterministic process. The adaptive explanations may be beneficially applied to recommendations that are associated with content, products, and people, including recommendations that comprise advertisements.

54 Claims, 13 Drawing Sheets

(56) References Cited

U.S. PATENT DOCUMENTS 5,206,951 A 4/1993 Khoyi
5,375,244 A 12/1994 McNair
5,499,366 A 3/1996 Rosenberg
5,600,835 A 2/1997 Garland et al.
5,706,497 A 1/1998 Takahashi et al.
5,754,939 A 5/1998 Herz et al.
5,788,504 A 8/1998 Rice et al.
5,790,426 A 8/1998 Robinson
5,809,506 A 9/1998 Copeland
5,812,691 A 9/1998 Udupa et al.
5,815,710 A 9/1998 Martin et al.
5,867,799 A 2/1999 Lang et al.
5,875,446 A 2/1999 Brown
5,893,085 A 4/1999 Phillips et al.
5,899,992 A 5/1999 Iyer et al.
5,903,478 A 5/1999 Fintel et al.
5,907,846 A 5/1999 Berner et al.
5,950,200 A 9/1999 Sudai et al.
5,963,965 A 10/1999 Vogel
5,966,126 A 10/1999 Szabo
5,974,415 A 10/1999 Schreiber
5,983,214 A 11/1999 Lang et al.
5,999,942 A 12/1999 Talati
6,012,070 A 1/2000 Cheng
6,016,394 A 1/2000 Walker
6,024,505 A 2/2000 Shinohara
6,029,195 A 2/2000 Herz
6,038,668 A 3/2000 Chipman
6,041,311 A 3/2000 Chislenko et al.
6,049,799 A 4/2000 Mangat et al.
6,134,559 A 10/2000 Brumme et al.
6,154,723 A 11/2000 Cox et al.
6,195,657 B1 2/2001 Rucker et al.
6,269,369 B1 7/2001 Robertson
6,285,999 B1 9/2001 Page
6,314,420 B1 11/2001 Lang et al.
6,321,221 B1 11/2001 Bieganski
6,326,946 B1 12/2001 Moran
6,374,290 B1 4/2002 Scharber et al.
6,438,579 B1 8/2002 Hosken
6,468,210 B1 10/2002 Iliff
6,556,951 B1 4/2003 Deleo et al.
6,571,279 B1 5/2003 Herz et al.
6,611,822 B1 8/2003 Beams et al.
6,647,257 B2 11/2003 Owensby
6,675,237 B1 1/2004 Asaad et al.
6,766,366 B1 7/2004 Schafer et al.
6,771,765 B1 8/2004 Crowther et al.
6,775,664 B2 8/2004 Lang et al.
6,795,826 B2 9/2004 Flinn et al.
6,801,227 B2 10/2004 Bocionek et al.
6,826,534 B1 11/2004 Gupta
6,834,195 B2 12/2004 Bramndenberg
6,845,374 B1 1/2005 Oliver et al.
6,871,163 B2 3/2005 Hiller et al.
6,873,967 B1 3/2005 Kalagnanam
6,912,505 B2 6/2005 Linden
6,922,672 B1 7/2005 Hailpern
6,934,748 B1 8/2005 Louviere et al.
6,947,922 B1 9/2005 Glance
6,970,871 B1 11/2005 Rayburn
6,981,040 B1 12/2005 Konig
7,023,979 B1 4/2006 Wu
7,065,532 B2 6/2006 Elder et al.
7,071,842 B1 7/2006 Brady, Jr.
7,073,129 B1 7/2006 Robarts et al.
7,080,082 B2 7/2006 Elder et al.
7,081,849 B2 7/2006 Collins et al.
7,103,609 B2 9/2006 Elder et al.
7,110,989 B2 9/2006 Iemoto et al.
7,130,844 B2 10/2006 Elder et al.
7,149,736 B2 12/2006 Chkodrov et al.
7,162,508 B2 1/2007 Messina
7,167,844 B1 1/2007 Leong
7,188,153 B2 3/2007 Lunt et al.
7,212,983 B2 5/2007 Redmann et al.
7,272,586 B2 9/2007 Nauck et al.
7,324,963 B1 1/2008 Ruckart
7,343,364 B2 3/2008 Bram et al.
7,366,759 B2 4/2008 Trevithick et al.
7,373,389 B2 5/2008 Rosenbaum et al.
7,375,838 B2 5/2008 Moneypenny
7,401,121 B2 7/2008 Wong
7,403,901 B1 7/2008 Carley et al.
7,433,876 B2 10/2008 Spivack et al.
7,454,464 B2 11/2008 Puthenkulam et al.
7,461,058 B1 12/2008 Rauser et al.
7,467,212 B2 12/2008 Adams et al.
7,493,294 B2 2/2009 Flinn et al.
7,512,612 B1 3/2009 Akella et al.
7,519,912 B2 4/2009 Moody et al.
7,526,458 B2 4/2009 Flinn et al.
7,526,459 B2 4/2009 Flinn et al.
7,526,464 B2 4/2009 Flinn et al.
7,539,652 B2 5/2009 Flinn et al.
7,558,748 B2 7/2009 Ehring et al.
7,567,916 B1 7/2009 Koeppel
7,568,148 B1 7/2009 Bharat et al.
7,571,183 B2 * 8/2009 Renshaw et al. ..... 1/1
7,596,597 B2 9/2009 Liu
7,606,772 B2 10/2009 Flinn
7,630,986 B1 12/2009 Herz et al.
7,676,034 B1 3/2010 Wu
7,680,770 B1 3/2010 Buyukkokten et al.
7,739,231 B2 6/2010 Flinn
7,818,392 B1 10/2010 Martino et al.
7,831,535 B2 11/2010 Flinn
7,860,811 B2 12/2010 Flinn
7,890,871 B2 2/2011 Etkin
7,904,341 B2 3/2011 Flinn et al.
7,904,511 B2 3/2011 Ryan et al.
7,921,036 B1 4/2011 Sharma et al.
7,958,457 B1 6/2011 Brandenberg et al.
7,966,224 B1 6/2011 Wagner
8,001,008 B2 8/2011 Engle
8,010,458 B2 8/2011 Galbreath et al.
8,015,119 B2 9/2011 Buyukkokten et al.
8,060,462 B2 11/2011 Flinn
8,060,463 B1 11/2011 Spiegel
8,065,383 B2 11/2011 Carlson et al.
8,069,076 B2 11/2011 Oddo
8,108,245 B1 1/2012 Hosea et al.
8,224,756 B2 7/2012 Roberts
RE43,768 E 10/2012 Flinn
8,373,741 B2 2/2013 Roberts
8,380,579 B2 2/2013 Flinn
8,458,119 B2 6/2013 Flinn
8,458,120 B2 6/2013 Flinn
8,478,716 B2 7/2013 Flinn
8,515,900 B2 8/2013 Flinn
8,515,901 B2 8/2013 Flinn
RE44,559 E 10/2013 Flinn
8,566,263 B2 10/2013 Flinn
8,600,920 B2 12/2013 Flinn
8,600,926 B2 12/2013 Flinn
8,615,484 B2 12/2013 Flinn
8,645,292 B2 2/2014 Flinn
8,645,312 B2 2/2014 Flinn
RE44,966 E 6/2014 Flinn
RE44,967 E 6/2014 Flinn
RE44,968 E 6/2014 Flinn
2001/0047290 A1 11/2001 Petras
2001/0047358 A1 11/2001 Flinn et al.
2001/0049623 A1 12/2001 Aggarwal et al.
2002/0016786 A1 2/2002 Pitkow et al.
2002/0049617 A1 4/2002 Lencki et al.
2002/0049738 A1 4/2002 Epstein
2002/0052873 A1 5/2002 Delgado et al.
2002/0062368 A1 5/2002 Holtzman
2002/0065721 A1 * 5/2002 Lema et al. ..... 705/14
2002/0069102 A1 6/2002 Vellante et al.
2002/0093537 A1 7/2002 Bocionek et al.
2002/0161664 A1 10/2002 Shaya et al.
2002/0180805 A1 12/2002 Chickering et al.

(56) References Cited

U.S. PATENT DOCUMENTS

| | | | | |
|---|---|---|---|---|
| 2002/0194161 | A1 | 12/2002 | McNamee et al. | |
| 2003/0023427 | A1 | 1/2003 | Cassin et al. | |
| 2003/0028498 | A1 | 2/2003 | Hayes-Roth | |
| 2003/0055666 | A1 | 3/2003 | Roddy | |
| 2003/0101449 | A1 | 5/2003 | Bentolila | |
| 2003/0105682 | A1* | 6/2003 | Dicker et al. | 705/27 |
| 2003/0154126 | A1 | 8/2003 | Gehlot | |
| 2003/0216960 | A1 | 11/2003 | Postrel | |
| 2003/0225550 | A1 | 12/2003 | Hiller | |
| 2003/0229896 | A1 | 12/2003 | Buczak | |
| 2003/0233374 | A1 | 12/2003 | Spinola et al. | |
| 2004/0068552 | A1 | 4/2004 | Kotz et al. | |
| 2004/0107125 | A1 | 6/2004 | Guheen | |
| 2004/0122803 | A1 | 6/2004 | Dom et al. | |
| 2004/0186776 | A1 | 9/2004 | Llach | |
| 2005/0033657 | A1 | 2/2005 | Herrington | |
| 2005/0091245 | A1* | 4/2005 | Chickering et al. | 707/100 |
| 2005/0097008 | A1 | 5/2005 | Teicher | |
| 2005/0097204 | A1 | 5/2005 | Horowitz et al. | |
| 2005/0197922 | A1 | 9/2005 | Pezaris | |
| 2005/0267973 | A1 | 12/2005 | Carlson et al. | |
| 2006/0036476 | A1 | 2/2006 | Kelm | |
| 2006/0042483 | A1 | 3/2006 | Work | |
| 2006/0092074 | A1 | 5/2006 | Collins et al. | |
| 2006/0112098 | A1* | 5/2006 | Renshaw et al. | 707/7 |
| 2006/0136589 | A1 | 6/2006 | Konig | |
| 2006/0184482 | A1 | 8/2006 | Flinn et al. | |
| 2006/0200432 | A1 | 9/2006 | Flinn | |
| 2006/0200433 | A1 | 9/2006 | Flinn | |
| 2006/0200434 | A1 | 9/2006 | Flinn | |
| 2006/0200435 | A1 | 9/2006 | Flinn | |
| 2006/0230021 | A1 | 10/2006 | Diab et al. | |
| 2007/0150470 | A1 | 6/2007 | Brave | |
| 2007/0156614 | A1 | 7/2007 | Flinn | |
| 2007/0174220 | A1 | 7/2007 | Flinn | |
| 2007/0203872 | A1 | 8/2007 | Flinn et al. | |
| 2007/0208729 | A1* | 9/2007 | Martino | 707/5 |
| 2007/0250653 | A1 | 10/2007 | Jones | |
| 2007/0287473 | A1 | 12/2007 | Dupray | |
| 2008/0097821 | A1* | 4/2008 | Chickering et al. | 705/10 |
| 2008/0172461 | A1 | 7/2008 | Thattai et al. | |
| 2008/0249967 | A1 | 10/2008 | Flinn | |
| 2008/0249968 | A1 | 10/2008 | Flinn et al. | |
| 2008/0288354 | A1 | 11/2008 | Flinn et al. | |
| 2009/0018918 | A1 | 1/2009 | Moneypenny | |
| 2009/0144075 | A1 | 6/2009 | Flinn et al. | |
| 2011/0153452 | A1 | 6/2011 | Flinn et al. | |
| 2014/0207582 | A1 | 7/2014 | Flinn | |

FOREIGN PATENT DOCUMENTS

| | | |
|---|---|---|
| EP | 1630701 | 1/2006 |
| EP | 1630700 | 3/2006 |
| WO | WO/98/58473 | 12/1998 |
| WO | WO/2000/014625 | 3/2000 |
| WO | WO/2000/075798 | 12/2000 |
| WO | WO/2001/093112 | 6/2001 |
| WO | WO/2002/094566 | 11/2002 |
| WO | WO/2005/116852 | 4/2005 |
| WO | WO/2005/054982 | 6/2005 |
| WO | WO/2005/052738 | 9/2005 |
| WO | WO/2005/103983 | 3/2011 |

OTHER PUBLICATIONS

Tintarev, Nava; "Explanations of Recommendations"; ACM; 2007; Conference on Recommender Systems; pp. 203-206.*

International Search Report for PCT/US04/37176; Mailing Date: Mar. 27, 2006.

Written Opinion for PCT/USO4/37176; Mailing Date: Mar. 27, 2006.

Cheung et al., "Mining customer product ratings for personalized marketing" Decision Support Systems, 2003, pp. 231-243.

Adopting user profiles and behavior patterns in a Web-TV recommendation system Kuan-Chung Chen; Wei-Guang Teng; Consumer Electronics, 2009. ISCE '09. IEEE 13th International Symposium on May 25-28, 2009 pp. 320-324 Digital Object Identifier 10.1109/ISCE.2009.5157045.

Situation-Aware Adaptive Recommendation to Assist Mobile Users in a Campus Environment Bouzeghoub, A.; Kien Ngoc Do; Wives, L.K.;Advanced Information Networking and Applications, 2009. AINA '09. International Conference on May 26-29, 2009 pp. 503-509 Digital Object Identifier 10.1109/AINA.2009.120.

Research on Personalized Service System in E-Supermarket by using Adaptive Recommendation Algorithm Yan-Wen Wu; Qi Luo; Min Liu; Zheng-Hong Wu; Li-Yong Wan; Machine Learning and Cybernetics, 2006 International Conference on Aug. 13-16, 2006 pp. 4507-4510 Digital Object identifier 10.1109/ICMLC.2006.259167.

Media Browsing for Mobile Devices Based on Resolution Adaptive Recommendation Yi Liu; Zhi Yang; Xiaoyu Deng; Jiajun Bu; Chun Chen; Communications and Mobile Computing, 2009. CMC '09. Wri International Conference on vol. 3, Jan. 6-8, 2009 pp. 285-290 Digital Object Identifier 10.1109/CMC.2009.124.

Improving the Readability of Clustered Social Networks using Node Duplication Henry, N.; Bezerianos, A.; Fekete, J.-D.; Visualization and Computer Graphics, IEEE Transactions on vol. 14, Issue 6, Nov.-Dec. 2008 pp. 1317-1324 Digital Object Identifier 10.1109/TVCG.2008.141.

Intelligent social network modeling and analysis Yager, R.R.; Intelligent System and Knowledge Engineering, 2008. ISKE 2008. 3rd International Conference on vol. 1, Nov. 17-19, 2008 pp. 5-6 Digital Object Identifier 10.1109/ISKE.2008.4730886.

Implicit Social Network Model for Predicting and Tracking the Location of Faults Ing-Xiang Chen; Cheng-Zen Yang; Ting-Kun Lu; Jaygarl, H.; Computer Software and Applications, 2008. COMPSAC '08. 32nd Annual IEEE International Jul. 28, 2008-Aug. 1, 2008 pp. 136-143 Digital Object Identifier 10.1109/COMPSAC.2008.162.

Improving cooperation in peer-to-peer systems using social networks Wenyu Wang; Li Zhao; Ruixi Yuan; Parallel and Distributed Processing Symposium, 2006. IPDPS 2006. 20th International Apr. 25-29, 2006 p. 8 pp. Digital Object Identifier 10.1109/IPDPS.2006.1639703.

Towards a Model for Inferring Trust in Heterogeneous Social Networks Akhoondi, M.; Habibi, J.; Sayyadi, M.; Modeling & Simulation, 2008. AICMS 08. Second Asia International Conference on May 13-15, 2008 pp. 52-58 Digital Object Identifier 10.1109/AMS.2008.167.

Manyworlds ("Epiture content solutions platform" Jan. 2001; pp. 1-11.

Frey et al. ("Mixture modeling by Affinity Propgation" Neural Information Processing Systems 18: Jan. 2006; pp. 379-386.

Frey and Dueck, "Clustering by Passing Messages Between Data Points," Science, Feb. 16, 2007, pp. 972-976, vol. 315, AAAS, USA.

Frey and Dueck, Supporting Online Material for "Clustering by Passing Messages Between Data Points," Science Express, Jan. 11, 2007, AAAS USA.

Mezard, "Where are they Exemplars?" Science, Feb. 16, 2007, pp. 949-951, vol. 315, AAAS, USA.

Applying similarity metrics to 3D acquisition in structured-light systems, Jay, G.T.; Smith, R.; Pattern Recognition, 2008. ICPR 2008. 19th International Conference on Digital Object Identifier: 10.1109/ICPR.2008.4761305 Publication Year: 2008, pp. 1-4.

Mining User's Interest from Reading Behavior in E-learning System, Yongquan Liang; Zhongying Zhao; Qingtian Zeng; Software Engineer, Artificial Intelligence, Networking, and Parallel/Distributed Computing, 2007. SNPD 2007. Eigth ACIS International Conference on vol. 2, Digital Object Identifier: 10.1109/SNPD.2007.330 pp.417-422.

A quality preserving exact histogram specification, Avanaki, A.N.; Telecommunications, 2008. IST 2008. International Symposium on Digital Object Identifier: 10.1109/ISTEL.2008.4651409 Publication Year: 2008, pp. 798-803.

(56) References Cited

OTHER PUBLICATIONS

Automatic 3D face verification from range data, Gang Pan; Zhaohui Wu; Yunhe Pan; Multimedia and Expo, 2003. ICME '03. Proceedings. 2003 International Conference on vol. 3 Digital Object Identifier: 10.1109/ICME.20031221266 Publication Year 2003, pp. III-133-6 vol. 3.
International Search Report for PCT/US01/07990; Mailing Date: Nov. 26, 2002.
International Preliminary Examination Report for PCT/US01/07990; Date of Completion of report: Jan. 22, 2007.
Wiesner S. et al, SemaLink: an approach for semantic browsing through large distributed document spaces; Digitial Libraries, 1996 ADL '96., Proceedings of the Third Forum on Research and Technology Advances in Washington, DC, USA May 13-15, 1996, Los Alamitos, CA, USA IEEE Comput. Sac, US; May 13, 1996, pp. 86-94, XP010164913; ISBN: 0-8186-7402-4.
Hsieh-Chang Tu et al: An architecture and category knowledge for intelligent information retrieval agents; System Sciences, 1998, Proceedings of the Thirty-First Hawaii International Conference on Kohala Coast, HI, USA Jan. 6-9, 1998, Los Alamitos, CA, USA, IEEE Compuut. Soc, US; Jan. 6, 1998, pp. 405-414, XP010263101.
Guoqing Chen et al, Extending ER/EER concepts towards fuzzy conceptual data modeling; Fuzzy Systems Proceedings, 1998. IEEE World Congress on Computational Intelligence., The 1998 IEEE International Conference on Anchorage, AK, USA May 4-9, 1998, New York, USA, IEEE, US, May 4, 1998, pp. 1320-1325, XP010287458; ISBN: 0-7803-4863-X; Section 4.
Babowal D et al: From information to knowledge: introducing WebStract's knowledge engineering approach, Electrical and Computer Engineering, 1999 IEE Canadian Conference on Edmonton, Alta, Canada May 9-12, 1999, Piscataway, NJ, USA, IEEE, US, May 9, 1999, pp. 1525-1530, XP010359717; ISBN: 078035579-2.
Doulamis N. D et al: "A neural network approach to interactive content-based retrieval of video databases" Image Processing, 1999. ICIP 99. Proceedings. 1999 International Conference on Kobe, Japan Oct. 24-28, 1999, Piscataway, NJ, USA,IEEE, US, vol. 2, Oct. 24, 1999 (Oct. 24, 1999), pp. 116-120, XP010369099 ISBN: 0-7803-5467-2.
Boughanem M et al: "Query modification based on relevance backpropagation in an ad hoc environment" Information Processing & Management, Elsevier, Barking, GB, vol. 35, No. 2, Mar. 1999 (Mar. 1999), pp. 121-139, XP004164720 ISSN: 0306-4573.
Cooper J W et al: "Lexical navigation: visually prompted query expansion and refinement" ACM 0-89791-868-1/97/7, 1997, XP002265696.
Lagoze C: "The Warwick Framework: A Container Architecture for Diverse Sets of Metadata" D-LIB Magazine, Corporation for National Research Initiatives, Reston, VA, US, Jul./Aug. 1996 (Aug. 1996), XP002086110 ISSN: 1082-9873.
Perkowitz, Mike; Etzioni, Oren "Towards adaptive Websites: conceptual framework and case study" Computer Networks 31 (1999) p. 1245-1258; XP4304552, PII:S1389-1286 (99) 00017-1.
Dynamic consumer Profiling and Tiered Pricing using Software Agents; Prithviraj Dasgupta, P. Michael Melliar-Smith, Electronic Commerce Research; Boston Jul.-Oct. 2003, vol. 3, Issue 3-4; p. 277.
Written Opinion for PCT/US05/11951; mailed Jun. 20, 2008.
International Search Report for PCT/US05/11951; Mailed Jun. 20, 2008.
International Search Report for PCT/US02/016208; Mailed Aug. 28, 2002.
Maria Barra, et al. "'Common' Web Paths in a Group Adaptive System," 2003 Proceedings of the Fourteenth ACM Conference on Hypertext and Hypermedia (2003).
Johan Bollen, "Group User Models for Personalized Hyperlink Recommendations," 1892 Lecture Notes in Computer Science 38-50 (2000).
A. Dieberger, et al., "Social Navigation: Techniques for Building More Usable Systems," Interactions 36-45 (2000).
Bamshad Mobasher, et al, "Creating Adaptive Web Sites Through Usage-Based Clustering of URLs," 1999 Workshop on Knowledge and Data Engineering Exchange 19-25 (1999).
Nan Niu, "Understanding Web Usage for Dynamic Web-Site Adaptation: A Case Study," 2002 Proceedings of the Fourth International Workshop on Web Site Evolution (2002).
Cyrus Shahabi & Yi-Shin Chen, "An Adaptive Recommendation System without Explicit Acquisition of User Relevance Feedback," 14 Distributed and Parallel Databases 173-192 (2003).
Osmar R. Zaiane, "Building a Recommender Agent for e-Learning Systems," Proceedings of the International Conference on Computers in Education (2002).
Jinmook Kim, et al., "Using Implicit Feedback for User Modeling in Internet and Internet Searching," College Park: College of Library and Information Services, University of Maryland (2000).
R. Cowie, et al., "Emotion Recognition in Human-Computer Interaction," IEEE Signal Processing Magazine 32-80 (2001).
Rosalind W. Picard & Jonathan Klein, "Computers that Recognise and Respond to User Emotion: Theoretical and Practical Implications," MIT Media Lab Tech Report 538 (2001).
Joannis Vlachakis, et al., "IKUM: An Integrated Web Personalization Platform Based on Content Structures and Usage Behavior" (2000).
Tarek Helmy, et al., "Adaptive Exploiting User Profile and Interpretation Policy for Searching and Browsing the Web on KODAMA System," Graduate School of Information Science and Electrical Engineering, Kyushu University (2000).
Mike Reddy and Graham P. Fletcher, "An Adaptive Mechanism for Web Browser Cache Management," IEEE Internet Computing 78-81, Jan.-Feb. 1998.
Ellen Spertus et al, Evaluating Similarity Measures: A Large-Scale Study in the Orkut Social Network, Aug. 21-24, 2005, pp. 678-684.
Jonathan L. Herlocker et al., Explaining Collaborative Filtering Recommendations, Dec. 2000.
Mustafa Bilgic et al., Explaining Recommendations: Satisfaction vs. Promotion, Jan. 9, 2005.
PR Newswire, PlanetAll Plans to Make a World of Difference in Busy Lives, Nov. 14, 1996.
Ajay Jain, Let's Connect—Using LinkedIn to get ahead at work, 2006.
Przemyslaw Kazienko et al., Recommendation Framework for Online Social Networks, 2006.
Hugo Liu et al., InterestMap—Harvesting Social Network Profiles for Recommendations, Jan. 2005.
Vander Veer, Facebook—The Missing Manual, 2008.
Orkut Blog, Finding friends made easy with Orkut friend suggestions, Sep. 8, 2009.
Anne P. Mitchell, MySpace to Debut "People You May Know" Feature, Oct. 27, 2008.
Pleasure and Pain blog, People You May Know, Mar. 30, 2008.
LinkedIn Blog, Learn more about "People you may know," Apr. 11, 2008.
LinkedIn Blog, LinkedIn Groups You Might Like (Late), Sep. 26, 2008.
LinkedIn Blog, News Recommendation and Discovery Improvements (Late), Jun. 26, 2008.
LinkedIn Blog, Viewers of this Profile Also Viewed, Jan. 23, 2008.
Aguilera, M., et al., Matching Events in a Content-based Subscription System (1999) In PODC'99 Atlanta, GA, pp. 53-61.
Lukose, R. et al,, SHOCK: Communicating withComputational Messages and Automatic Private Profiles, (2003) WWW2003, May 20-24, Budapest, Hungary.
Fisher et al. Accurate retail testing of fashion merchandise: Methodology and application. Fisher, Marshall; Kumar Rajaram. Marketing Science 19.3 (Summer 2000): 266-278.
Stolowitz Ford Cowger LLP, Listing of Related Cases Jan. 21, 2013.
Terry et al., "Social Net: Using Patterns of Physical Proximity Over Time to Infer Shared Interests" 2002.
Schubert, Petra et al.; "Collaboration Platforms for Virtual Student Communities"; IEEE 2002; 10 Pages.
PCT International Search Report Opinion for PCTUS2004/037176 May 29, 2006.
PCT International Search Report Art for PCTUS2004/037176 Mar. 27, 2006.

* cited by examiner

Figure 11

3000

| 3010 Phrase Array | 3020 Phrase ID | 3030 Relative Frequency | 3040 Phrase | 3050 Phrase Attribute 1 | 3060 Phrase Attribute 2 |
|---|---|---|---|---|---|
| Array 1 | 1 | 1 | I've noticed you've been spending a lot of time with your profile lately ;-) | Sarcastic | User-attentive |
| Array 1 | 2 | 3 | It seems to me that you recently have been more interested in areas such as {1} | Business-like | User-attentive |
| Array 1 | 3 | 3032 1 | I've noticed your colleagues have been very interested recently in {1}-related topics | Business-like | Socially-attentive |
| Array 1 | 4 | 5 | Null | Null | Null |
| Array 2 | 1 | 2 | I know this is probably silly of me | Humorous | Introspective |
| Array 2 | 2 | 1 | I often wonder why you | Inquisitive | User-attentive |

4000

| 3010 Phrase Array | 3020 Phrase ID | 3030 Relative Frequency | 3040 Phrase | 3060 Phrase Attribute 2 | 3070 Phrase Attribute 3 |
|---|---|---|---|---|---|
| Array 3 | 1 | 1 | You know, I sense that I have become a lot more fun loving since I met you | Introspective | Humorous |
| Array 3 | 2 | 2 | I feel like I take myself a lot less seriously when I'm around you | Introspective | Humorous |
| Array 3 | 3 | 10 | Null | Null | Null |
| Array 4 | 1 | 1 | I keep wondering why I've become increasingly self-absorbed of late | Introspective | Introspective |
| Array 4 | 2 | 1 | Null | Null | Null |

ADAPTIVE RECOMMENDATION EXPLANATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[The present application claims priority under 35 U.S.C. §119(e) to U.S. Provisional Patent Application Ser. No. 60/944,516, entitled "Affinity-based Adaptive Recommendation Generation," filed Jun. 17, 2007 and to U.S. Provisional Patent Application Ser. No. 61/054,141, entitled "Adaptive Computer-based Personalities," filed May 17, 2008 and is a continuation-in-part of U.S. patent application Ser. No. 11/419,554 entitled "Adaptive Self-Modifying and Recombinant Systems" filed on May 22, 2006, which claimed priority under 35 U.S.C. §119 to PCT International Application No. PCT/US2004/037176, which claimed priority under 35 U.S.C. §119(e) to U.S. Provisional Patent Application Ser. No. 60/525,120, entitled "A Method and System for Adaptive Fuzzy Networks," filed Nov. 28, 2003.] *The present application is a reissue of U.S. patent application Ser. No. 12/139,486, filed Jun. 15, 2008, now U.S. Pat. No. 7,860,811, issued Dec. 28, 2010, entitled ADAPTIVE RECOMMENDATION EXPLANATIONS, which claims priority to U.S. Provisional Patent Application Ser. No. 60/944,516, filed Jun. 17, 2007, entitled AFFINITY-BASED ADAPTIVE RECOMMENDATION GENERATION and U.S. Provisional Patent Application Ser. No. 61/054,141, filed May 17, 2008, entitled ADAPTIVE COMPUTER-BASED PERSONALITIES and which is a continuation-in-part of U.S. patent application Ser. No. 11/419,554, filed May 22, 2006, now U.S. Pat. No. 7,539,652, issued May 26, 2009, which is a continuation of PCT International Application No. PCT/US2004/037176, filed Nov. 4, 2004 entitled ADAPTIVE RECOMBINANT SYSTEMS, which claims priority to U.S. Provisional Patent Application Ser. No. 60/525,120, filed Nov. 28, 2003, entitled A METHOD AND SYSTEM FOR ADAPTIVE FUZZY NETWORKS.*

FIELD OF THE INVENTION

This invention relates to methods and systems for computer-based generation and adaptation of communications to users over time based on usage behaviors.

BACKGROUND OF THE INVENTION

Computer-based applications in which the user interface includes communications to the user in a natural language (e.g., English) format have traditionally been non-adaptive—that is, the perceived "personality" of the computer-based application as represented by its communications to the user does not automatically adapt itself to the user over time, based on the user's interactions with the computer-based application. The inability of a computer-based personality to adapt over time also forecloses the possibility of the computer-based personality exhibiting the capability of communicating to a user a sense of introspection and self-awareness with regard to changes in its personality over time, and also limits the effectiveness in conveying a sense of awareness to a user of changes in the behaviors of a user over time. Such static personality approaches of the prior art therefore significantly limit how engaging a computer-based application's user interface can be. Thus there is a need for computer-based personalities that can adapt to one or more users over time and thereby provide users with the experience of receiving more intelligent and even human-like communications from the system.

SUMMARY OF THE INVENTION

In accordance with the embodiments described herein, a method and system for adaptive computer-based personalities, including adaptive explanations associated with computer-generated recommendations, is disclosed that addresses the shortcomings of prior art approaches. The present invention may apply features of adaptive recombinant systems as described in U.S. patent application Ser. No. 11/419,554 entitled "Adaptive Self-Modifying and Recombinant Systems" on May 22, 2006, which is incorporated herein by reference in its entirety.

Other features and embodiments will become apparent from the following description, from the drawings, and from the claims.

BRIEF DESCRIPTION OF THE DRAWINGS

FIG. 11 is a diagram of exemplary data structures associated with the adaptive personality process and the self-aware personality process of FIGS. 9 and 10, according to some embodiments;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

A method and system for adapting computer-based personalities, including adaptive explanations associated with recommendations, as manifested through textual or audio communications, is disclosed. In some embodiments, a computer-based adaptive communication comprises one or more phrases that are automatically selected by a computer-based system, at least in part, through non-deterministic means. The frequency distribution of the plurality of potential phrases for selection in a potential adaptive communication is updated based on behaviors of the one or more recipients of a previous communication. Thus, the probabilistic selection of phrases included in the adaptive communications, and hence the "personality" of the computer-based system, is influenced by prior usage behaviors. In some embodiments, the computer-based personality may also exhibit "self-awareness" by monitoring changes in phrase frequency distributions over time, and including in its adaptive communications appropriate self-aware phraseology based on an evaluation of the changes in phrase frequency distributions. Awareness phrases associated with changes in user behavior over time may also be expressed in the adaptive communications in some embodiments.

Adaptive System

Figure 1:
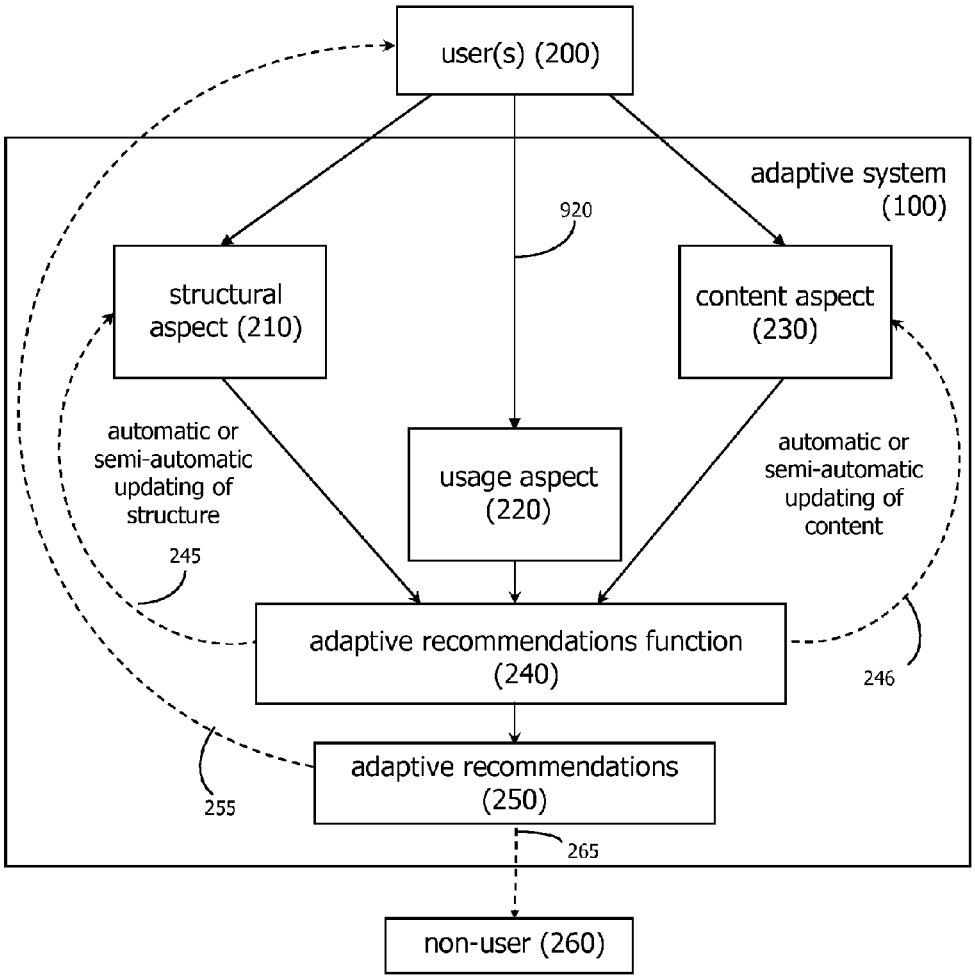
FIG. 1 is a block diagram of an adaptive system, according to some embodiments.

In some embodiments, the present invention may apply the methods and systems of an adaptive system as depicted by FIG. 1. FIG. 1 is a generalized depiction of an adaptive system 100, according to some embodiments. The adaptive system 100 includes three aspects: 1) a structural aspect 210, a usage aspect 220, and a content aspect 230. One or more users 200 interact with the adaptive system 100. An adaptive recommendations function 240 may produce adaptive recommendations 250, based upon the user interactions that are either delivered to the user 200 or applied to the adaptive system 100.

As used herein, one or more users 200 may be a single user or multiple users. As shown in FIG. 1, the one or more users 200 may receive the adaptive recommendations 250. Non-users 260 of the adaptive system 100 may also receive adaptive recommendations 250 from the adaptive system 100.

A user 200 may be a human entity, a computer system, or a second adaptive system (distinct from the adaptive system 100) that interacts with, or otherwise uses the adaptive system. The one or more users 200 may include non-human users of the adaptive system 100. In particular, one or more other adaptive systems may serve as virtual system "users." These other adaptive systems may operate in accordance with the architecture of the adaptive system 100. Thus, multiple adaptive systems may be mutual users for one another.

It should be understood that the structural aspect 210, the content aspect 230, the usage aspect 220, and the recommendations function 240 of the adaptive system 100, and elements of each, may be contained within one computer, or distributed among multiple computers. Furthermore, one or more non-adaptive systems may be modified to become one or more adaptive systems 100 by integrating the usage aspect 220 and the recommendations function 240 with the one or more non-adaptive systems.

The term "computer system" or the term "system," without further qualification, as used herein, will be understood to mean either a non-adaptive or an adaptive system. Likewise, the terms "system structure" or "system content," as used herein, will be understood to refer to the structural aspect 210 and the content aspect 230, respectively, whether associated with a non-adaptive system or the adaptive system 100. The term "system structural subset" or "structural subset," as used herein, will be understood to mean a portion or subset of the structural aspect 210 of a system.

Structural Aspect

Figure 2A:
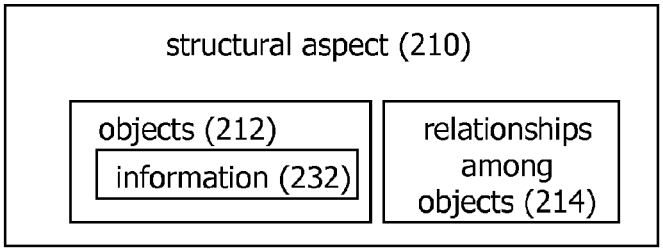
FIGS. 2A, 2B, and 2C are block diagrams of the structural aspect, the content aspect, and the usage aspect of the adaptive system of FIG. 1, according to some embodiments.
Figure 2B:
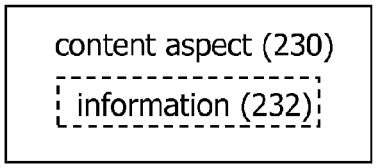

The structural aspect 210 of the adaptive system 100 is depicted in the block diagram of FIG. 2A. The structural aspect 210 comprises a collection of system objects 212 that are part of the adaptive system 100, as well as the relationships among the objects 214. The relationships among objects 214 may be persistent across user sessions, or may be transient in nature. The objects 212 may include or reference items of content, such as text, graphics, audio, video, interactive content, or embody any other type or item of information. The objects 212 may also include references to content, such as pointers. Computer applications, executable code, or references to computer applications may also be stored as objects 212 in the adaptive system 100. The content of the objects 212 is known herein as information 232. The information 232, though part of the object 214, is also considered part of the content aspect 230, as depicted in FIG. 2B, and described below.

The objects 212 may be managed in a relational database, or may be maintained in structures such as flat files, linked lists, inverted lists, hypertext networks, or object-oriented databases. The objects 212 may include meta-information 234 associated with the information 232 contained within, or referenced by the objects 212.

As an example, in some embodiments, the World-wide Web could be considered a structural aspect, where web pages constitute the objects of the structural aspect and links between web pages constitute the relationships among the objects. Alternatively, or in addition, in some embodiments, the structural aspect could be comprised of objects associated with an object-oriented programming language, and the relationships between the objects associated with the protocols and methods associated with interaction and communication among the objects in accordance with the object-oriented programming language.

The one or more users 200 of the adaptive system 100 may be explicitly represented as objects 212 within the system 100, therefore becoming directly incorporated within the structural aspect 210. The relationships among objects 214 may be arranged in a hierarchical structure, a relational structure (e.g. according to a relational database structure), or according to a network structure.

Content Aspect

The content aspect 230 of the adaptive system 100 is depicted in the block diagram of FIG. 2B. The content aspect 230 comprises the information 232 contained in, or referenced by the objects 212 that are part of the structural aspect 210. The content aspect 230 of the objects 212 may include text, graphics, audio, video, and interactive forms of content, such as applets, tutorials, courses, demonstrations, modules, or sections of executable code or computer programs. The one or more users 200 interact with the content aspect 230.

The content aspect 230 may be updated based on the usage aspect 220, as well as associated metrics. To achieve this, the adaptive system 100 may employ the usage aspect of other systems. Such systems may include, but are not limited to, other computer systems, other networks, such as the World Wide Web, multiple computers within an organization, other adaptive systems, or other adaptive recombinant systems. In this manner, the content aspect 230 benefits from usage occurring in other environments.

Usage Aspect

Figure 2C:
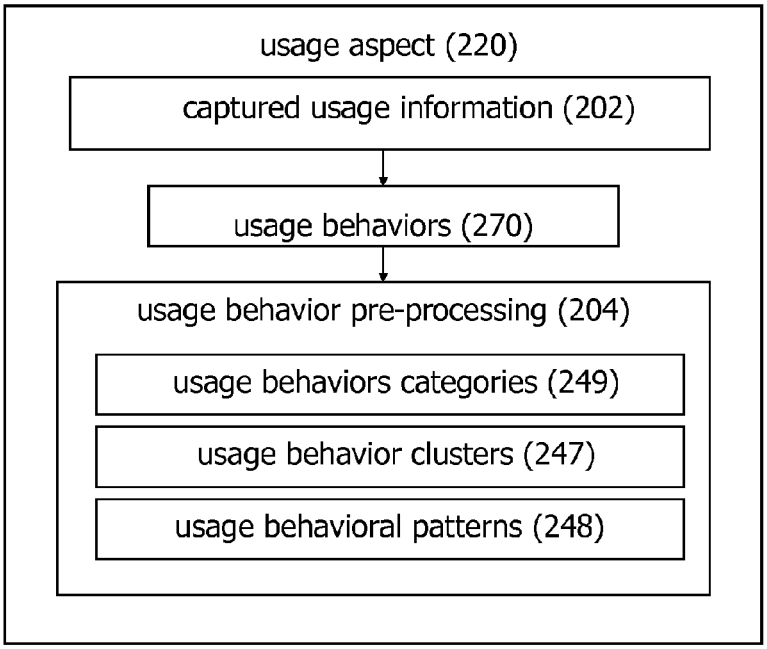

The usage aspect 220 of the adaptive system 100 is depicted in the block diagram of FIG. 2C, although it should be understood that the usage aspect 220 may also exist independently of adaptive system 100 in some embodiments. The usage aspect 220 denotes captured usage information 202, further identified as usage behaviors 270, and usage behavior pre-processing 204. The usage aspect 220 thus reflects the tracking, storing, categorization, and clustering of the use and associated usage behaviors of the one or more users 200 interacting with the adaptive system 100.

The captured usage information 202, known also as system usage or system use 202, includes any user behavior 920 exhibited by the one or more users 200 while using the system. The adaptive system 100 tracks and stores user key strokes and mouse clicks, for example, as well as the time period in which these interactions occurred (e.g., timestamps), as captured usage information 202. From this captured usage information 202, the adaptive system 100 identifies usage behaviors 270 of the one or more users 200 (e.g., web page access or email transmission). Finally, the usage aspect 220 includes usage-behavior pre-processing, in which usage behavior categories 249, usage behavior clusters 247, and usage behavioral patterns 248 are formulated for subsequent processing of the usage behaviors 270 by the adaptive system 100. Some usage behaviors 270 identified by the adaptive system 100, as well as usage behavior categories 249 designated by the adaptive system 100, are listed in Table 1, and described in more detail, below.

The usage behavior categories 249, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 249 include types of usage behaviors 270, such as accesses, referrals to other users, collaboration with other users, and so on. These categories and more are included in Table 1, below. Usage behavior clusters 247 are groupings of one or more usage behaviors 270, either within a particular usage behavior category 249 or across two or more usage categories. The usage behavior pre-processing 204 may also determine new "clusterings" of user behaviors 270 in previously undefined usage behavior categories 249, across categories, or among new communities. Usage behavior patterns 248, also known as "usage behavioral patterns" or "behavioral patterns," are also groupings of usage behaviors 270 across usage behavior categories 249. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200. The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences 252 associated with other adaptive or non-adaptive systems.

Adaptive Recommendations

As shown in FIG. 1, the adaptive system 100 generates adaptive recommendations 250 using the adaptive recommendations function 240. The adaptive recommendations 250, or suggestions, enable users to more effectively use and navigate through the adaptive system 100.

The adaptive recommendations 250 are presented as structural subsets of the structural aspect 210. The adaptive recommendations 250 may be in the context of a currently conducted activity of the system 100, a currently accessed object 232, or a communication with another user 200. The adaptive recommendations 250 may also be in the context of a historical path of executed system activities, accessed objects 212, or communications during a specific user session or across user sessions. The adaptive recommendations 250 may be without context of a current activity, currently accessed object 212, current session path, or historical session paths. Adaptive recommendations 250 may also be generated in response to direct user requests or queries, including search requests. Such user requests may be in the context of a current system navigation, access or activity, or may be outside of any such context. The adaptive recommendations 250 may comprise advertising content.

Fuzzy Content Network

Figure 3:
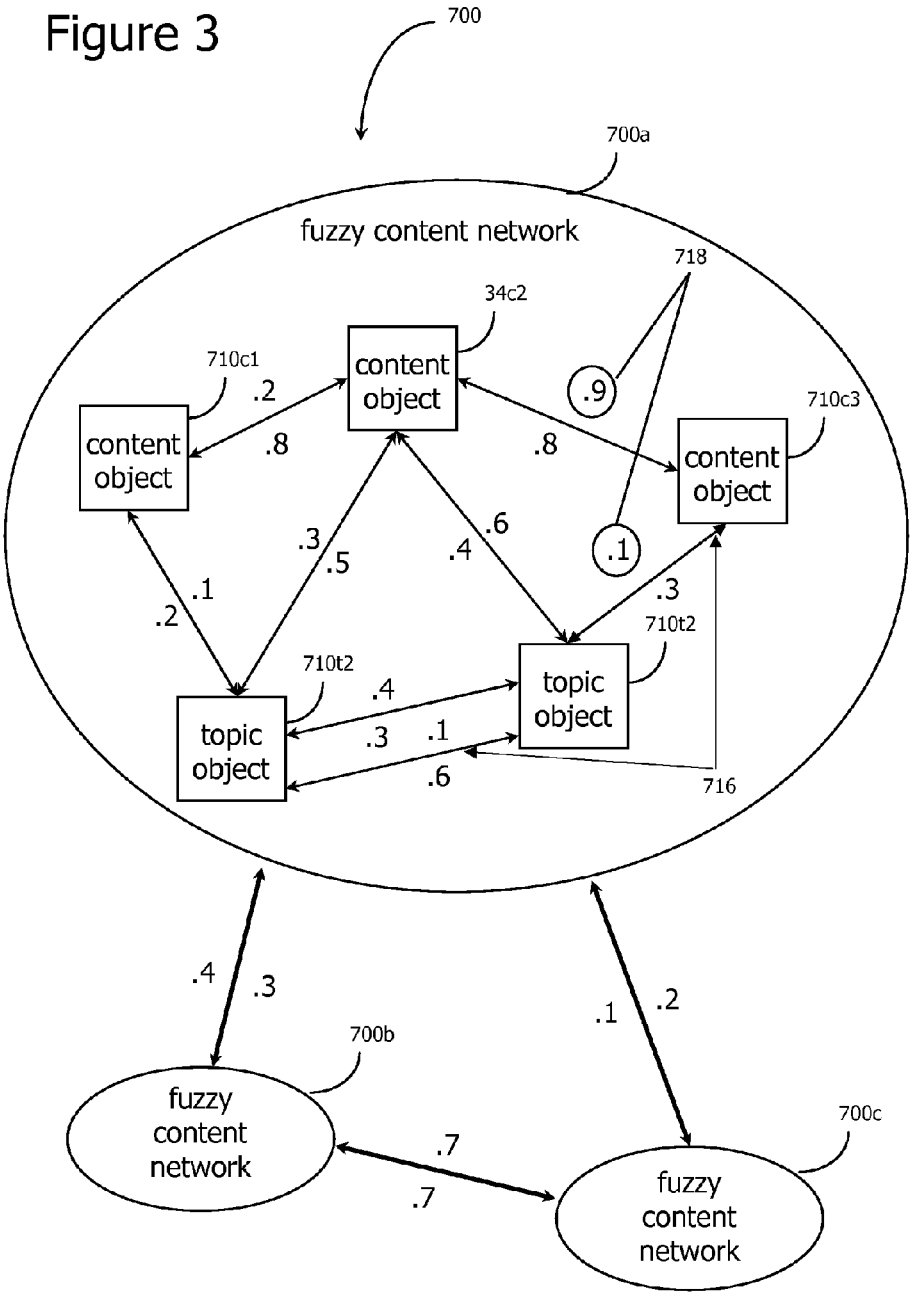
FIG. 3 is a block diagram of a fuzzy content network-based system, according to some embodiments.

In some embodiments, the structural aspect 210 of the adaptive system 100, comprises a fuzzy content network. A fuzzy content network 700 is depicted in FIG. 3.

The fuzzy content network 700, including content subnetworks 700a, 700b, and 700c. The content network 700 includes "content," "data," or "information," packaged in modules known as objects 710.

The content network 700 discretizes information as "objects." In contrast to typical procedural computer programming structures, objects are defined at a higher level of abstraction. This level of abstraction allows for powerful, yet simple, software architectures.

Figure 4A:
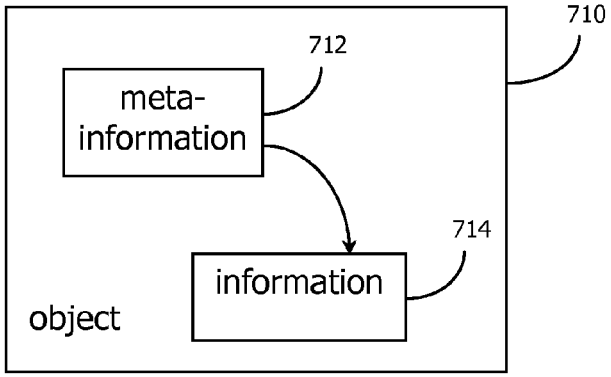
FIGS. 4A, 4B, and 4C are block diagrams of an object, a topic object, and a content object, according to some embodiments.

One benefit to organizing information as objects is known as encapsulation. An object is encapsulated when only essential elements of interaction with other objects are revealed. Details about how the object works internally may be hidden. In FIG. 4A, for example, the object 710 includes meta-information 712 and information 714. The object 710 thus encapsulates information 714.

Another benefit to organizing information as objects is known as inheritance. The encapsulation of FIG. 4A, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 4B:
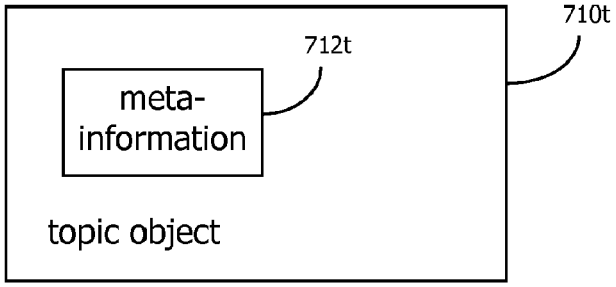
Figure 4C:
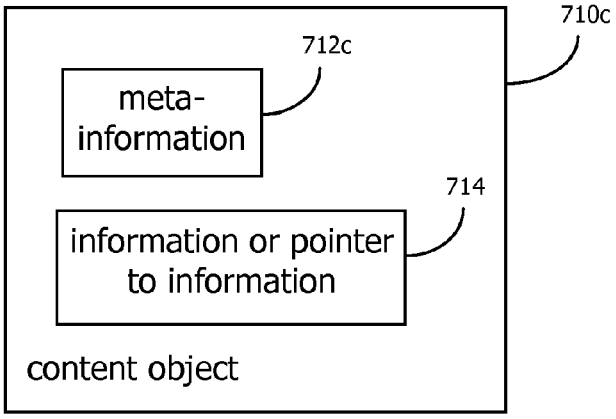

In the content network 700, the objects 710 may be either topic objects 710t or content objects 710c, as depicted in FIGS. 4B and 4C, respectively. Topic objects 710t are encapsulations that contain meta-information 712t and relationships to other objects (not shown), but do not contain an embedded pointer to reference associated information. The topic object 710t thus essentially operates as a "label" to a class of information. The topic object 710 therefore just refers to "itself" and the network of relationships it has with other objects 710.

Content objects 710c, as shown in FIG. 4C, are encapsulations that contain meta-information 36c and relationships to other objects 710 (not shown). Additionally, content objects 710c may include either an embedded pointer to information or the information 714 itself (hereinafter, "information 714").

The referenced information 714 may include files, text, documents, articles, images, audio, video, multi-media, software applications and electronic or magnetic media or signals. Where the content object 714c supplies a pointer to information, the pointer may be a memory address. Where the content network 700 encapsulates information on the Internet, the pointer may be a Uniform Resource Locator (URL).

The meta-information 712 supplies a summary or abstract of the object 710. So, for example, the meta-information 712t for the topic object 710t may include a high-level description of the topic being managed. Examples of meta-information 712t include a title, a sub-title, one or more descriptions of the topic provided at different levels of detail, the publisher of the topic meta-information, the date the topic object 710t was created, and subjective attributes such as the quality, and attributes based on user feedback associated with the referenced information. Meta-information may also include a pointer to referenced information, such as a uniform resource locator (URL), in one embodiment.

The meta-information 712c for the content object 710c may include relevant keywords associated with the information 714, a summary of the information 714, and so on. The meta-information 712c may supply a "first look" at the objects 710c. The meta-information 712c may include a title, a sub-title, a description of the information 714, the author of the information 714, the publisher of the information 714, the publisher of the meta-information 712c, and the date the content object 710c was created, as examples. As with the topic object 710t, meta-information for the content object 710c may also include a pointer.

In FIG. 3, the content sub-network 700a is expanded, such that both content objects 710c and topic objects 710t are visible. The various objects 34 of the content network 700 are interrelated by degrees, using relationships 716 (unidirectional and bidirectional arrows) and relationship indicators 716 (values). Each object 710 may be related to any other object 710, and may be related by a relationship indicator 718, as shown. Thus, while information 714 is encapsulated in the objects 710, the information 714 is also interrelated to other information 714 by a degree manifested by the relationship indicators 718.

The relationship indicator 718 is a numerical indicator of the relationship between objects 710. Thus, for example, the relationship indicator 718 may be normalized to between 0 and 1, inclusive, where 0 indicates no relationship, and 1 indicates a subset relationship. Or, the relationship indicators 718 may be expressed using subjective descriptors that depict the "quality" of the relationship. For example, subjective descriptors "high," "medium," and "low" may indicate a relationship between two objects 710.

The relationship 716 between objects 710 may be bidirectional, as indicated by the double-pointing arrows. Each double-pointing arrow includes two relationship indicators 718, one for each "direction" of the relationships between the objects 710.

As FIG. 3 indicates, the relationships 716 between any two objects 710 need not be symmetrical. That is, topic object 710t1 has a relationship of "0.3" with content object 710c2, while content object 710c2 has a relationship of "0.5" with topic object 710t1. Furthermore, the relationships 716 need not be bi-directional—they may be in one direction only. This could be designated by a directed arrow, or by simply setting one relationship indicator 718 of a bi-directional arrow to "0," the null relationship value.

The content networks 700A, 700B, 700C may be related to one another using relationships of multiple types and associated relationship indicators 718. For example, in FIG. 3, content sub-network 700a is related to content sub-network 700b and content sub-network 700c, using relationships of multiple types and associated relationship indicators 718. Likewise, content sub-network 700b is related to content sub-network 700a and content sub-network 700c using relationships of multiple types and associated relationship indicators 718.

Individual content and topic objects 710 within a selected content sub-network 700a may be related to individual content and topic objects 710 in another content sub-network 700b. Further, multiple sets of relationships of multiple types and associated relationship indicators 718 may be defined between two objects 710.

For example, a first set of relationships 716 and associated relationship indicators 718 may be used for a first purpose or be available to a first set of users while a second set of relationships 716 and associated relationship indicators 718 may be used for a second purpose or available to a second set of users. For example, in FIG. 3, topic object 710t1 is bidirectionally related to topic object 710t2, not once, but twice, as indicated by the two double arrows. An indefinite number of relationships 716 and associated relationship indicators 718 may therefore exist between any two objects 710 in the fuzzy content network 700. The multiple relationships 716 may correspond to distinct relationship types. For example, a relationship type might be the degree an object 710 supports the thesis of a second object 710, while another relationship type might be the degree an object 710 disconfirms the thesis of a second object 710. The content network 700 may thus be customized for various purposes and accessible to different user groups in distinct ways simultaneously.

The relationships among objects 710 in the content network 700, as well as the relationships between content networks 700a and 700b, may be modeled after fuzzy set theory. Each object 710, for example, may be considered a fuzzy set with respect to all other objects 710, which are also considered fuzzy sets. The relationships among objects 710 are the degrees to which each object 710 belongs to the fuzzy set represented by any other object 710. Although not essential, every object 710 in the content network 700 may conceivably have a relationship with every other object 710.

The topic objects 710t encompass, and are labels for, very broad fuzzy sets of the content network 700. The topic objects 710t thus may be labels for the fuzzy set, and the fuzzy set may include relationships to other topic objects 710t as well as related content objects 710c. Content objects 710c, in contrast, typically refer to a narrower domain of information in the content network 700.

Figure 5:
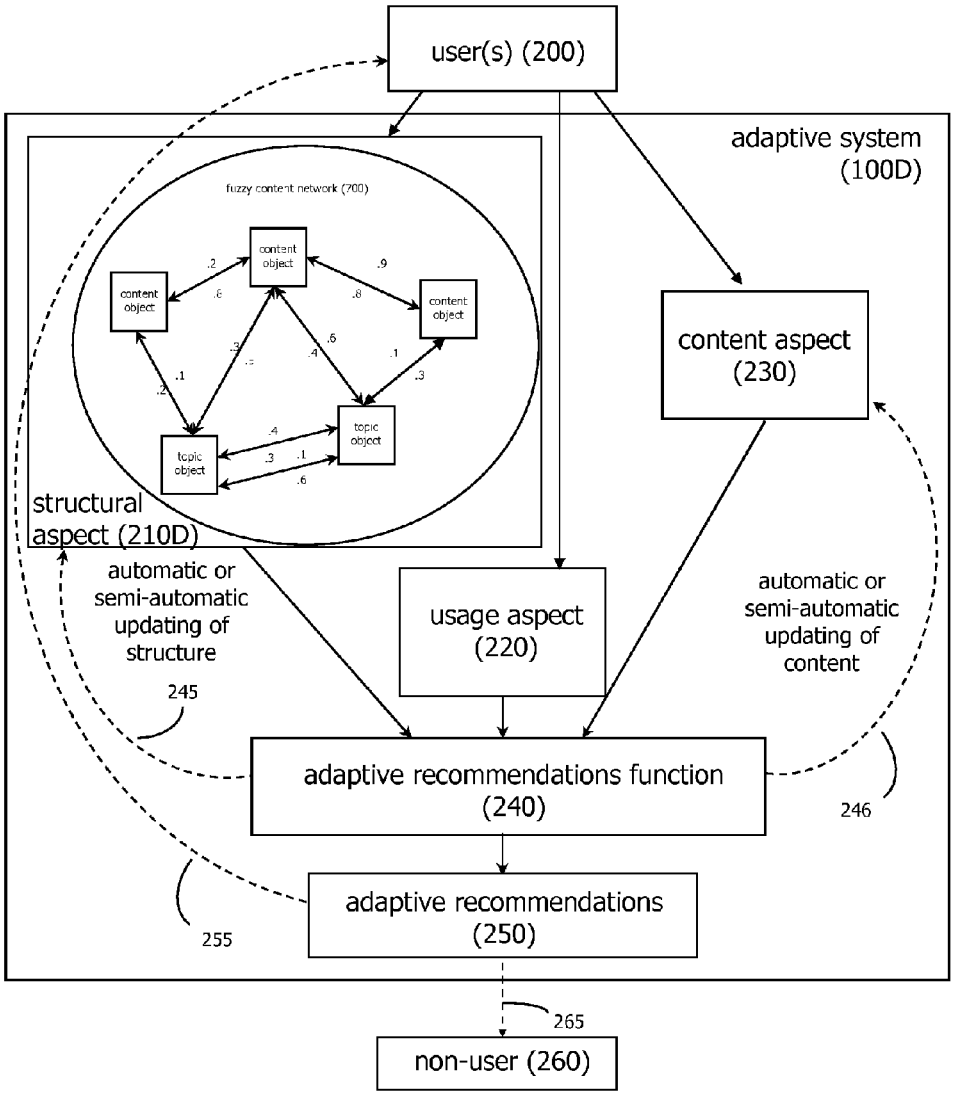
FIG. 5 is a block diagram of a fuzzy content network-based adaptive system, according to some embodiments.

The adaptive system 100 of FIG. 1 may operate in a fuzzy content network environment, such as the one depicted in FIG. 3. In FIG. 5, an adaptive system 100D includes a structural aspect 210D that is a fuzzy content network. Thus, adaptive recommendations 250 generated by the adaptive system 100D are also structural subsets that are themselves fuzzy content networks.

User Behavior and Usage Framework

Figure 6:
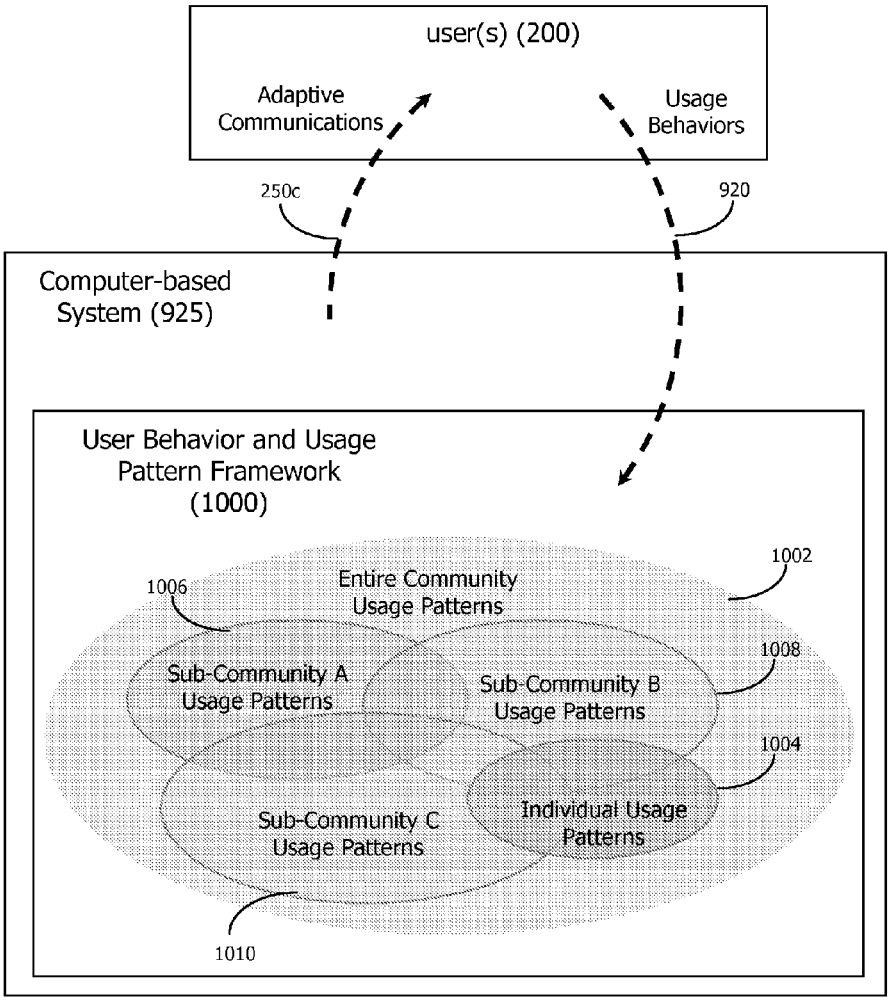
FIG. 6 is a block diagram of a computer-based system that enables adaptive communications, according to some embodiments.

FIG. 6 depicts a usage framework 1000 for performing preference and/or intention inferencing of tracked or monitored usage behaviors 920 by one or more computer-based systems 925. The one or more computer-based systems 925 may comprise an adaptive system 100. The usage framework 1000 summarizes the manner in which usage patterns are managed within the one or more computer-based systems 925. Usage behavioral patterns associated with an entire community, affinity group, or segment of users 1002 are captured by the one or more computer-based systems 925. In another case, usage patterns specific to an individual are captured by the one or more computer-based systems 925. Various sub-communities of usage associated with users may also be defined, as for example "sub-community A" usage patterns 1006, "sub-community B" usage patterns 1008, and "sub-community C" usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single user or multiple users. Sub-communities may likewise include one or more users. Thus, the individual usage patterns 1004 in FIG. 6 may also be described as representing the usage patterns of a community or a sub-community. For the one or more computer-based systems 925, usage behavior patterns may be segmented among communities and individuals so as to effectively enable adaptive communications 250c delivery for each sub-community or individual.

The communities identified by the one or more computer-based systems 925 may be determined through self-selection, through explicit designation by other users or external administrators (e.g., designation of certain users as "experts"), or through automatic determination by the one or more computer-based systems 925. The communities themselves may have relationships between each other, of multiple types and values. In addition, a community may be composed not of human users, or solely of human users, but instead may include one or more other computer-based systems, which may have reason to interact with the one or more computer-based systems 925. Or, such computer-based systems may provide an input into the one or more computer-based systems 925, such as by being the output from a search engine. The interacting computer-based system may be another instance of the one or more computer-based systems 925.

The usage behaviors 920 included in Table 1 may be categorized by the one or more computer-based systems 925 according to the usage framework 1000 of FIG. 6. For example, categories of usage behavior may be captured and categorized according to the entire community usage patterns 1002, sub-community usage patterns 1006, and individual usage patterns 1004. The corresponding usage behavior information may be used to infer preferences and/or intentions and interests at each of the user levels.

Multiple usage behavior categories shown in Table 1 may be used by the one or more computer-based systems 925 to make reliable inferences of the preferences and/or intentions and/or intentions of a user with regard to elements, objects, or items of content associated with the one or more computer-based systems 925. There are likely to be different preference inferencing results for different users.

As shown in FIG. 6, the one or more computer-based systems 925 delivers adaptive communications to the user 200. These adaptive communications 250c may include adaptive recommendations 250 or associated explanations for the recommendations, or may be other types of communications to the user 200, including advertising. In some embodiments the adaptive communications 250c comprise one or more phrases, where phrases comprise one or more words. The adaptive communications 250c may be delivered to the user 200 in a written form, an audio form, or a combination of these forms.

By introducing different or additional behavioral characteristics, such as the duration of access of an item of content a more adaptive communication 250c is enabled. For example, duration of access will generally be much less correlated with navigational proximity than access sequences will be, and therefore provide a better indicator of true user preferences and/or intentions and/or intentions. Therefore, combining access sequences and access duration will generally provide better inferences and associated system structural updates than using either usage behavior alone. Effectively utilizing additional usage behaviors as described above will generally enable increasingly effective system structural updating. In addition, the one or more computer-based systems 925 may employ user affinity groups to enable even more effective system structural updating than are available merely by applying either individual (personal) usage behaviors or entire community usage behaviors.

Furthermore, relying on only one or a limited set of usage behavioral cues and signals may more easily enable potential "spoofing" or "gaming" of the one or more computer-based systems 925. "Spoofing" or "gaming" the one or more computer-based systems 925 refers to conducting consciously insincere or otherwise intentional usage behaviors 920, so as to influence the costs of advertisements 910 of the one or more computer-based systems 925. Utilizing broader sets of system usage behavioral cues and signals may lessen the effects of spoofing or gaming. One or more algorithms may be employed by the one or more computer-based systems 925 to detect such contrived usage behaviors, and when detected, such behaviors may be compensated for by the preference and interest inferencing algorithms of the one or more computer-based systems 925.

In some embodiments, the one or more computer-based systems 925 may provide users 200 with a means to limit the tracking, storing, or application of their usage behaviors 920. A variety of limitation variables may be selected by the user 200. For example, a user 200 may be able to limit usage behavior tracking, storing, or application by usage behavior category described in Table 1. Alternatively, or in addition, the selected limitation may be specified to apply only to particular user communities or individual users 200. For example, a user 200 may restrict the application of the full set of her usage behaviors 920 to preference or interest inferences by one or more computer-based systems 925 for application to only herself, and make a subset of process behaviors 920 available for application to users only within her workgroup, but allow none of her process usage behaviors to be applied by the one or more computer-based systems 925 in making inferences of preferences and/or intentions and/or intentions or interests for other users.

User Communities

As described above, a user associated with one or more systems 925 may be a member of one or more communities of interest, or affinity groups, with a potentially varying degree of affinity associated with the respective communities. These affinities may change over time as interests of the user 200 and communities evolve over time. The affinities or relationships among users and communities may be categorized into specific types. An identified user 200 may be considered a member of a special sub-community containing only one member, the member being the identified user. A user can therefore be thought of as just a specific case of the more general notion of user or user segments, communities, or affinity groups.

Figure 7:
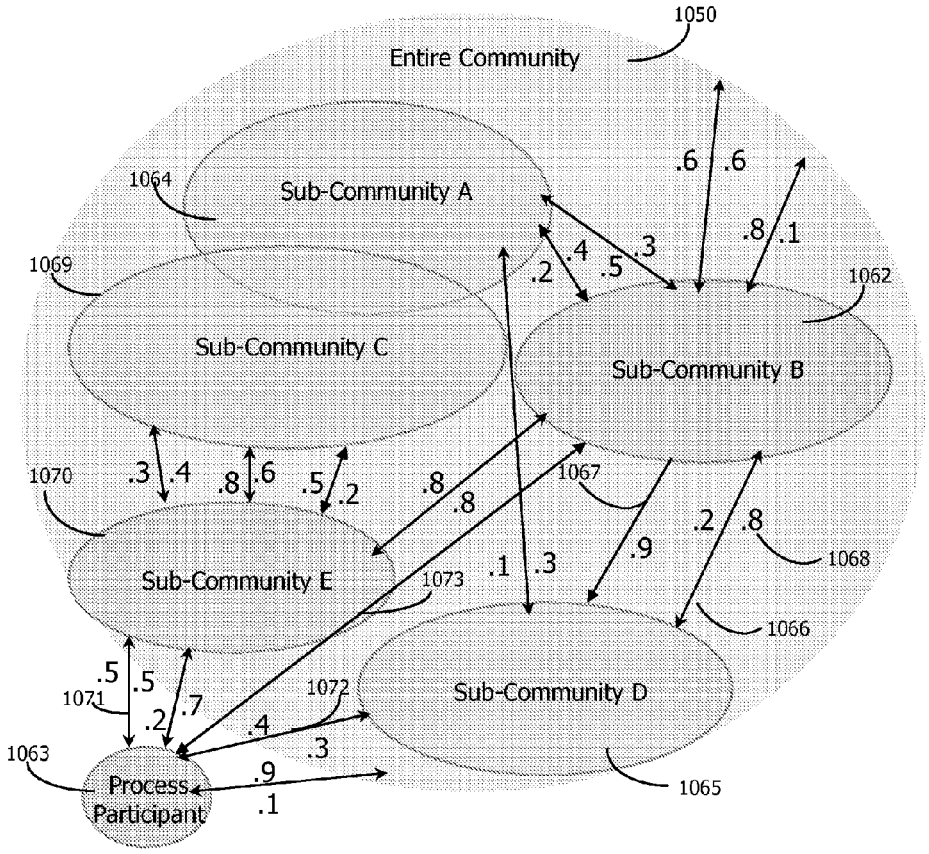
FIG. 7 is a diagram illustrating user communities and associated relationships, according to some embodiments.

FIG. 7 illustrates the affinities among user communities and how these affinities may automatically or semi-automatically be updated by the one or more computer-based systems 925 based on user preferences and/or intentions which are derived from user behaviors 920. An entire community 1050 is depicted in FIG. 7. The community may extend across organizational, functional, or process boundaries. The entire community 1050 includes sub-community A 1064, sub-community B 1062, sub-community C 1069, sub-community D 1065, and sub-community E 1070. A user 1063 who is not part of the entire community 1050 is also featured in FIG. 7.

Sub-community B 1062 is a community that has many relationships or affinities to other communities. These relationships may be of different types and differing degrees of relevance or affinity. For example, a first relationship 1066 between sub-community B 1062 and sub-community D 1065 may be of one type, and a second relationship 1067 may be of a second type. (In FIG. 7, the first relationship 1066 is depicted using a double-pointing arrow, while the second relationship 1067 is depicted using a unidirectional arrow.)

The relationships 1066 and 1067 may be directionally distinct, and may have an indicator of relationship or affinity associated with each distinct direction of affinity or relationship. For example, the first relationship 1066 has a numerical value 1068, or relationship value, of "0.8." The relationship value 1068 thus describes the first relationship 1066 between sub-community B 1062 and sub-community D 1065 as having a value of 0.8.

The relationship value may be scaled as in FIG. 7 (e.g., between 0 and 1), or may be scaled according to another interval. The relationship values may also be bounded or unbounded, or they may be symbolically represented (e.g., high, medium, low).

The user 1063, which could be considered a user community including a single member, may also have a number of relationships to other communities, where these relationships are of different types, directions and relevance. From the perspective of the user 1063, these relationship types may take many different forms. Some relationships may be automatically formed by the one or more computer-based systems 925, for example, based on interests or geographic location or similar traffic/usage patterns. Thus, for example the entire community 1050 may include users in a particular city. Some relationships may be context-relative. For example, a community to which the user 1063 has a relationship could be associated with a certain process, and another community could be related to another process. Thus, sub-community E 1070 may be the users associated with a product development business to which the user 1063 has a relationship 1071; sub-community B 1062 may be the members of a cross-business innovation process to which the user 1063 has a relationship 1073; sub-community D 1065 may be experts in a specific domain of product development to which the user 1063 has a relationship 1072. The generation of new communities which include the user 1063 may be based on the inferred interests of the user 1063 or other users within the entire community 1050.

Membership of communities may overlap, as indicated by sub-communities A 1064 and C 1069. The overlap may result when one community is wholly a subset of another community, such as between the entire community 1050 and sub-community B 1062. More generally, a community overlap will occur whenever two or more communities contain at least one user or user in common. Such community subsets may be formed automatically by the one or more systems 925, based on preference inferencing from user behaviors 920. For example, a subset of a community may be formed based on an inference of increased interest or demand of particular content or expertise of an associated community. The one or more computer-based systems 925 is also capable of inferring that a new community is appropriate. The one or more computer-based systems 925 will thus create the new community automatically.

For each user, whether residing within, say, sub-community A 1064, or residing outside the community 1050, such as the user 1063, the relationships (such as arrows 1066 or 1067), affinities, or "relationship values" (such as numerical indicator 1068), and directions (of arrows) are unique. Accordingly, some relationships (and specific types of relationships) between communities may be unique to each user. Other relationships, affinities, values, and directions may have more general aspects or references that are shared among many users, or among all users of the one or more computer-based systems 925. A distinct and unique mapping of relationships between users, such as is illustrated in FIG. 7, could thus be produced for each user by the one or more computer-based systems 925.

The one or more computer-based systems 925 may automatically generate communities, or affinity groups, based on user behaviors 920 and associated preference inferences. In addition, communities may be identified by users, such as administrators of the process or sub-process instance 930. Thus, the one or more computer-based systems 925 utilizes automatically generated and manually generated communities.

The communities, affinity groups, or user segments aid the one or more computer-based systems 925 in matching interests optimally, developing learning groups, prototyping process designs before adaptation, and many other uses. For example, some users that use or interact with the one or more computer-based systems 925 may receive a preview of a new adaptation of a process for testing and fine-tuning, prior to other users receiving this change.

The users or communities may be explicitly represented as elements or objects within the one or more computer-based systems 925.

Preference and/or Intention Inferences

Figure 8:
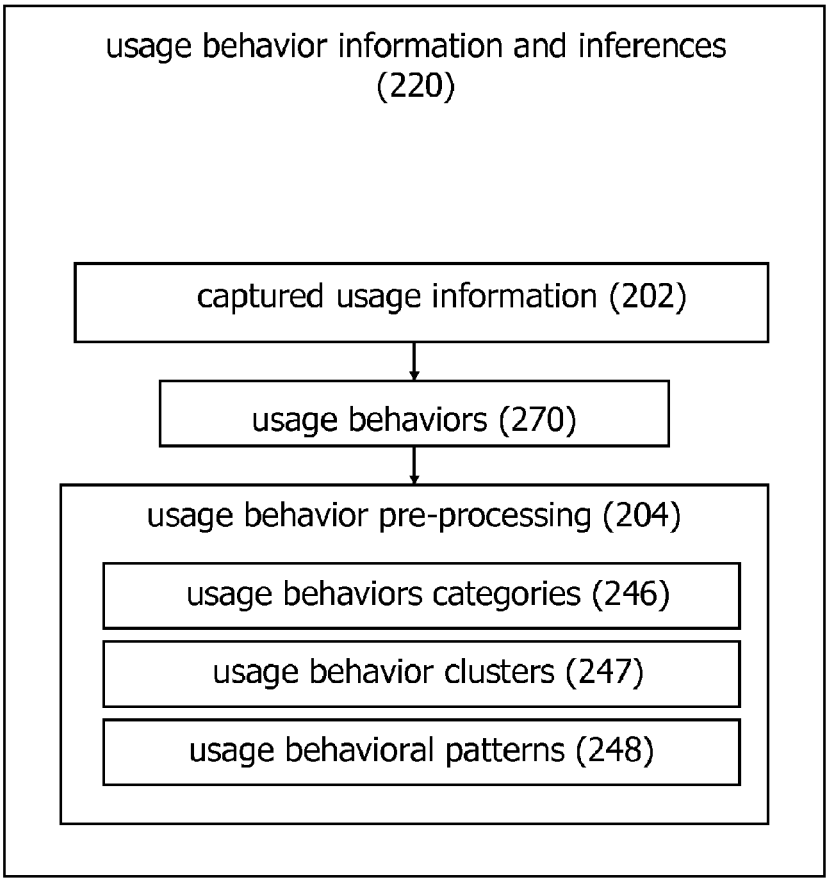
FIG. 8 is a block diagram of usage behavior processing functions of the computer-based system of FIG. 6, according to some embodiments.

The usage behavior information and inferences function 220 of the one or more computer-based systems 925 is depicted in the block diagram of FIG. 8. In embodiments where computer-based systems 925 is an adaptive system 100, then usage behavior information and inferences function 220 is equivalent to the usage aspect 220 of FIG. 1. The usage behavior information and inferences function 220 denotes captured usage information 202, further identified as usage behaviors 270, and usage behavior pre-processing 204. The usage behavior information and inferences function 220 thus reflects the tracking, storing, classification, categorization, and clustering of the use and associated usage behaviors 920 of the one or more users or users 200 interacting with the one or more computer-based systems 925.

The captured usage information 202, known also as system usage or system use 202, includes any interaction by the one or more users or users 200 with the system, or monitored behavior by the one or more users 200. The one or more computer-based systems 925 may track and store user key strokes and mouse clicks, for example, as well as the time period in which these interactions occurred (e.g., timestamps), as captured usage information 202. From this captured usage information 202, the one or more computer-based systems 925 identifies usage behaviors 270 of the one or more users 200 (e.g., web page access or physical location changes of the user). Finally, the usage behavior information and inferences function 220 includes usage-behavior pre-processing, in which usage behavior categories 246, usage behavior clusters 247, and usage behavioral patterns 248 are formulated for subsequent processing of the usage behaviors 270 by the one or more computer-based systems 925. Some usage behaviors 270 identified by the one or more computer-based systems 925, as well as usage behavior categories 246 designated by the one or more computer-based systems 925, are listed in Table 1, and are described in more detail below.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200, potentially including environmental aspects of the physical location(s). The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering.

User Behavior Categories

In Table 1, a variety of different user behaviors 920 are identified that may be assessed by the one or more computer-based systems 925 and categorized. The usage behaviors 920 may be associated with the entire community of users, one or more sub-communities, or with individual users or users of the one of more computer-based applications 925.

TABLE 1

Usage behavior categories and usage behaviors

| usage behavior category | usage behavior examples |
|---|---|
| navigation and access | activity, content and computer application accesses, including buying/selling<br>paths of accesses or click streams<br>execution of searches and/or search history |

TABLE 1-continued

Usage behavior categories and usage behaviors

| usage behavior category | usage behavior examples |
|---|---|
| subscription and self-profiling | personal or community subscriptions to process topical areas<br>interest and preference self-profiling<br>affiliation self-profiling (e.g., job function) |
| collaborative | referral to others<br>discussion forum activity<br>direct communications (voice call, messaging)<br>content contributions or structural alterations |
| reference | personal or community storage and tagging<br>personal or community organizing of stored or tagged information |
| direct feedback | user ratings of activities, content, computer applications and automatic recommendations<br>user comments |
| physiological responses | direction of gaze<br>brain patterns<br>blood pressure<br>heart rate |
| environmental conditions and location | current location<br>location over time<br>relative location to users/object references<br>current time<br>current weather condition |

A first category of process usage behaviors 920 is known as system navigation and access behaviors. System navigation and access behaviors include usage behaviors 920 such as accesses to, and interactions with computer-based applications and content such as documents, Web pages, images, videos, TV channels, audio, radio channels, multi-media, interactive content, interactive computer applications, e-commerce applications, or any other type of information item or system "object." These process usage behaviors may be conducted through use of a keyboard, a mouse, oral commands, or using any other input device. Usage behaviors 920 in the system navigation and access behaviors category may include, but are not limited to, the viewing or reading of displayed information, typing written information, interacting with online objects orally, or combinations of these forms of interactions with computer-based applications. This category includes the explicit searching for information, using, for example, a search engine. The search term may be in the form of a word or phrase to be matched against documents, pictures, web-pages, or any other form of on-line content. Alternatively, the search term may be posed as a question by the user.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the one or more computer-based systems 925, or may be associated with any other subset of the one or more computer-based systems 925. Subscriptions may thus indicate the intensity of interest with regard to elements of the one or more computer-based systems 925. The delivery of information to fulfill subscriptions may occur online, such as through electronic mail (email), on-line newsletters, XML feeds, etc., or through physical delivery of media.

Self-profiling refers to other direct, persistent (unless explicitly changed by the user) indications explicitly designated by the one or more users regarding their preferences and/or intentions and interests, or other meaningful attributes. A user 200 may explicitly identify interests or affiliations, such as job function, profession, or organization, and preferences and/or intentions, such as representative skill level (e.g., novice, business user, advanced). Self-profiling enables the one or more computer-based systems 925 to infer explicit preferences and/or intentions of the user. For example, a self-profile may contain information on skill levels or relative proficiency in a subject area, organizational affiliation, or a position held in an organization. A user 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and/or intentions and interests with regard to system use and associated topical areas, and with regard to degree of affinity with other user community subsets. A user may identify preferred methods of information receipt or learning style, such as visual or audio, as well as relative interest levels in other communities.

A third category of usage behaviors 920 is known as collaborative behaviors. Collaborative behaviors are interactions among the one or more users. Collaborative behaviors may thus provide information on areas of interest and intensity of interest. Interactions including online referrals of elements or subsets of the one or more computer-based systems 925, such as through email, whether to other users or to non-users, are types of collaborative behaviors obtained by the one or more computer-based systems 925.

Other examples of collaborative behaviors include, but are not limited to, online discussion forum activity, contributions of content or other types of objects to the one or more computer-based systems 925, or any other alterations of the elements, objects or relationships among the elements and objects of one or more computer-based systems 925. Collaborative behaviors may also include general user-to-user communications, whether synchronous or asynchronous, such as email, instant messaging, interactive audio communications, and discussion forums, as well as other user-to-user communications that can be tracked by the one or more computer-based systems 925.

A fourth category of process usage behaviors 920 is known as reference behaviors. Reference behaviors refer to the marking, designating, saving or tagging of specific elements or objects of the one or more computer-based systems 925 for reference, recollection or retrieval at a subsequent time. Tagging may include creating one or more symbolic expressions, such as a word or words, associated with the corresponding elements or objects of the one or more computer-based systems 925 for the purpose of classifying the elements or objects. The saved or tagged elements or objects may be organized in a manner customizable by users. The referenced elements or objects, as well as the manner in which they are organized by the one or more users, may provide information on inferred interests of the one or more users and the associated intensity of the interests.

A fifth category of process usage behaviors 920 is known as direct feedback behaviors. Direct feedback behaviors include ratings or other indications of perceived quality by individuals of specific elements or objects of the one or more computer-based systems 925, or the attributes associated with the corresponding elements or objects. The direct feedback behaviors may therefore reveal the explicit preferences and/or intentions of the user. In the one or more computer-based systems 925, the advertisements 910 may be rated by users 200. This enables a direct, adaptive feedback loop, based on explicit preferences and/or intentions specified by the user. Direct feedback also includes user-written comments and narratives associated with elements or objects of the computer-based system 925.

A sixth category of process usage behaviors is known as physiological responses. These responses or behaviors are associated with the focus of attention of users and/or the intensity of the intention, or any other aspects of the physiological responses of one or more users 200. For example, the direction of the visual gaze of one or more users may be determined. This behavior can inform inferences associated with preferences and/or intentions or interests even when no physical interaction with the one or more computer-based systems 925 is occurring. Even more direct assessment of the level of attention may be conducted through access to the brain patterns or signals associated with the one or more users. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by one or more regions of the brain.

Physiological responses may include any other type of physiological response of a user 200 that may be relevant for making preference or interest inferences, independently, or collectively with the other usage behavior categories. Other physiological responses may include, but are not limited to, utterances, gestures, movements, or body position. Attention behaviors may also include other physiological responses such as breathing rate, heart rate, blood pressure, or galvanic response.

A seventh category of process usage behaviors is known as environmental conditions and physical location behaviors. Physical location behaviors identify physical location and mobility behaviors of users. The location of a user may be inferred from, for example, information associated with a Global Positioning System or any other positionally or locationally aware system or device, or may be inferred directly from location information input by a user (e.g., a zip code or street address), or otherwise acquired by the computer-based systems 925. The physical location of physical objects referenced by elements or objects of one or more computer-based systems 925 may be stored for future reference. Proximity of a user to a second user, or to physical objects referenced by elements or objects of the computer-based application, may be inferred. The length of time, or duration, at which one or more users reside in a particular location may be used to infer intensity of interests associated with the particular location, or associated with objects that have a relationship to the physical location. Derivative mobility inferences may be made from location and time data, such as the direction of the user, the speed between locations or the current speed, the likely mode of transportation used, and the like. These derivative mobility inferences may be made in conjunction with geographic contextual information or systems, such as through interaction with digital maps or map-based computer systems. Environmental conditions may include the time of day, the weather, lighting levels, sound levels, and any other condition of the environment around the one or more users 200.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the one or more computer-based systems 925. The temporal patterns may include historical patterns, including how recently an element, object or item of content associated with one or more computer-based systems 925. For example, more recent behaviors may be inferred to indicate more intense current interest than less recent behaviors.

Another temporal pattern that may be tracked and contribute to preference inferences that are derived, is the duration associated with the access or interaction with the elements, objects or items of content of the one or more computer-based systems 925, or the user's physical proximity to physical objects referenced by system objects of the one or more computer-based systems 925, or the user's physical proximity to other users. For example, longer durations may generally be inferred to indicate greater interest than short durations. In addition, trends over time of the behavior patterns may be captured to enable more effective inference of interests and relevancy. Since delivered recommendations may include one or more elements, objects or items of content of the one or more computer-based systems 925, the usage pattern types and preference inferencing may also apply to interactions of the one or more users with the delivered recommendations 250 themselves, including accesses of, or interactions with, explanatory information regarding the logic or rationale that the one more computer-based systems 925 used in deciding to deliver the recommendation to the user.

Adaptive Communications Generation

In some embodiments, adaptive communications 250c or recommendations 250 may be generated for the one or more users 200 through the application of affinity vectors.

For example, in some embodiments, Member-Topic Affinity Vectors (MTAV) may be generated to support effective recommendations, wherein for a registered user or member 200 of the one or more computer-based systems 925 a vector is established that indicates the relative affinity (normalized to the [0,1] continuum) the member has for every object sub-network the member has access to. For computer-based systems 925 comprising a fuzzy content network-based structural aspect, the member affinity values of the MTAV may be in respect to topic networks.

So in general, for each registered member, e.g., member M, a hypothetical MTAV could be of a form as follows:

| MTAV for Member M | | | | | |
|---|---|---|---|---|---|
| Topic 1 | Topic 2 | Topic 3 | Topic 4 | . . . | Topic N |
| 0.35 | 0.89 | 0.23 | 0.08 | . . . | 0.14 |

The MTAV will therefore reflect the relative interests of a user with regard to all N of the accessible topics. This type of vector can be applied in two major ways:

A. To serve as a basis for generating adaptive communications 250c or recommendations 250 to the user 200

B. To serve as a basis for comparing the interests with one member 200 with another member 200, and to therefore determine how similar the two members are To generate the MTAV, any of the behaviors of Table 1 may be utilized. For example, in some embodiments the following example behavioral information may be used:

1) The topics the member has subscribed to received updates

2) The topics the member has accessed directly

3) The accesses the member has made to objects that are related to each topic

4) The saves the member has made of objects that are related to each topic

This behavioral information is listed above in a generally reverse order of importance from the standpoint of inferring member interests; that is, access information gathered over a significant number of accesses or over a significant period of time will generally provide better information than subscription information, and save information is typically more informative of interests than just accesses.

The following fuzzy network structural information may also be used to generate MTAV values:

5) The relevancies of each content object to each topic

6) The number of content objects related to each topic

Personal topics that are not shared with other users 200 may be included in MTAV calculations. Personal topics that have not been made publicly cannot be subscribed to by other members, and so could in this regard be unfairly penalized versus public topics. Therefore for the member who created the personal topic and co-owners of that personal topic, in some embodiments the subscription vector to may be set to "True," i.e. 1. There may exist personal topics that are created by a member 200 and that have never been seen or contributed to by any other member. This may not otherwise affect the recommendations 250 since the objects within that personal topic may be accessible by other members, and any other relationships these objects have to other topics will be counted toward accesses of these other topics.

In some embodiments the first step of the calculation is to use information 1-4 above to generate the following table or set of vectors for the member, as depicted in the following hypothetical example:

TABLE 2

| Member 1 Behaviors | Topic 1 | Topic 2 | Topic 3 | Topic 4 | . . . | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 112 | 55 | 23 | 6 | | 43 |
| Weighted Saves | 6 | 8 | 4 | 0 | . . . | 2 |

The Subscriptions vector of Table 2 contains either a 1 if the member has subscribed to a topic or is the owner/co-owner of a personal topic or a 0 if the member has not subscribed to the topic. The Topic Accesses vector contains the number of accesses to that topic's explore page by the member to a topic over a period of time, for example, the preceding 12 months.

The Weighted Accesses vector of Table 1 contains the number of the member's (Member 1) accesses over the last 12 months of each object multiplied by the relevancies to each topic summed across all accessed objects. (So for example, if Object 1 has been accessed 10 times in the last 12 months by Member 1 and it is related to Topic 1 by 0.8, and Object 2 has been accessed 4 times in the last 12 months by Member 1 and is related to Topic 1 at relevancy level 0.3, and these are the only objects accessed by Member 1 that are related to Topic 1, then Topic 1 would contain the value 10*0.8+4*0.3=9.2).

The Weighted Saves vector of Table 1 works the same way as the Weighted Accesses vector, except it is based on Member 1's object save data instead of access data.

In some embodiments, topic object saves are counted in addition to content object saves. Since a member saving a topic typically is a better indicator of the member's interest in the topic than just saving an object related to the said topic, it may be appropriate to give more "credit" for topic saves than just content object saves. For example, when a user saves a topic object, the following process may be applied:

If the Subscriptions vector indicator is not already set to "1" for this topic in Table 1, it is set to "1". (The advantage of this is even if the topic has been saved before 12 months ago, the user will still at least get subscription "credit" for the topic save even if they don't get credit for the next two calculations).

In exactly the same way as a saved content object, a credit is applied in the Weighted Accesses vector of Table 2 based on the relevancies of other topics to the saved topic.

A special "bonus" weighting in the Weighted Accesses vector of Table 2 for the topic itself using the weighting of "10"—which means a topic save is worth at least as much as 10 saves of content that are highly related to that topic.

The next step is to make some adjustments to Table 1. For example, it may be desirable scale the Weighted Accesses and Weighted Saves vectors by the number of objects that is related to each topic. The result is the number of accesses or saves per object per topic. This may be a better indicator of intensity of interest because it is not biased against topics with few related objects. However, per object accesses/saves alone could give misleading results when there are very few accesses or saves. So as a compromise, the formula that is applied to each topic, e.g., Topic N, may be a variation of the following:

((Weighted Accesses for Topic N)/(Objects related to Topic N))*Square Root(Weighted Accesses for Topic N)

This formula emphasizes per object accesses, but tempers this with a square root factor associated with the absolute level of accesses by the member. The result is a table, Table 2A, of the form:

TABLE 2A

| Member 1 Behaviors | Topic 1 | Topic 2 | Topic 3 | Topic 4 | . . . | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 9.1 | 12 | 3.2 | 0.6 | | 2.3 |
| Weighted Saves | 0.9 | 1.3 | 1.1 | 0 | . . . | 0.03 |

The next step is to transform Table 2A into a MTAV. In some embodiments, indexing factors, such as the following may be applied:

| Topic Affinity Indexing Factors | Weight |
|---|---|
| Subscribe Indexing Factor | 10 |
| Topic Indexing Factor | 20 |
| Accesses Indexing Factor | 30 |
| Save Indexing Factor | 40 |

These factors have the effect of ensuring normalized MTAV values ranges (e.g. 0-1 or 0-100) and they enable more emphasis on behaviors that are likely to provide relatively better information on member interests. In some embodiments, the calculations for each vector of Table 1A are transformed into corresponding Table 2 vectors as follows:

1. Table 3 Indexed Subscriptions for a topic by Member 1=Table 2A Subscriptions for a topic * Subscribe Indexing Factor
2. Table 3 Indexed Direct Topic Accesses by Member 1=Table 2A Topic Accesses* Topic Indexing Factor
3. Table 3 Indexed Accesses for a topic by Member 1=((Table 2A Weighted Accesses for a topic by Member 1)/(Max(Weighted Accesses of all Topics by Member 1)))*Accesses Indexing Factor
4. Table 3 Indexed Saves for a topic by Member 1=((Table 2A Weighted Saves for a topic by Member 1)/(Max (Weighted Saves of all Topics by Member 1)))* Saves Indexing Factor The sum of these Table 3 vectors results in the MTAV for the associated member 200 as shown in the hypothetical example of Table 3 below:

TABLE 3

| Member 1 Indexed Behaviors | Topic 1 | Topic 2 | Topic 3 | Topic 4 | . . . | Topic N |
|---|---|---|---|---|---|---|
| Subscriptions | 0 | 10 | 10 | 10 | | 10 |
| Topic Accesses | 5 | 1 | 20 | 0 | | 8 |
| Weighted Accesses | 11 | 1 | 30 | 12 | | 6 |
| Weighted Saves | 0 | 10 | 40 | 1 | | 2 |
| Member 1 MTAV | 16 | 22 | 100 | 23 | . . . | 26 |

Member-to-member affinities can be derived by comparing the MTAV's of a first member 200 and a second member 200. Statistical operators such as correlation coefficients may be applied to derive a sense of the distance between members in n-dimensional topic affinity space, where there N topics. Since different users may have access to different topics, the statistical correlation for a pair of members must be applied against MTAV subsets that contain only the topics that both members have access to. In this way, a member-to-member affinity vector (MMAV) can be generated for each member or user 200, and the most similar members, the least similar members, etc., can be identified for each member 200.

With the MTAV's and MMAV's, and Most Similar Member information, a set of candidate objects to be recommended can be generated. These candidate recommendations will, in a later processing step, be ranked, and the highest ranked to candidate recommendations will be delivered to the recommendation recipient. Recall that recommendations 250 may be in-context of navigating the system 925 or out-of-context of navigating the system 925. Following are more details on an exemplary set of steps related to generating out-of-context recommendations. At each of step the candidate objects may be assessed against rejection criteria (for example, the recommendation recipient has already recently received the candidate object may be a cause for immediate rejection) and against a maximum number of candidate objects to be considered.

1. Determine if there are objects that have been related to objects at a sufficient level of relatedness that have been "saved" by the recommendation recipient since the time the recommendation recipient saved the object. This may be a good choice for a first selection step because it would be expected that such objects would be highly relevant to the recommendation recipient.
2. Determine if the Most Similar Members to the recommendation recipient have "saved" (related) objects in the last 12 months to the recommendation recipient's highest affinity topics.
3. Determine if the Most Similar Members to the recommendation recipient have rated objects at a level greater than some threshold over some time period, that are related to the recommendation recipient's highest affinity topics.

4. Determine the most frequently accessed objects by the Most Similar Members over some period of time that are related to recommendation recipient's highest affinity topics.
5. Determine the highest influence objects that are related to recommendation recipient's highest affinity topics.

A variation of the out-of-context recommendation process may be applied for in-context recommendations, where the process places more emphasis of the closeness of the objects to the object being viewed in generating candidate recommendation objects.

For both out-of-context and in-context recommendations, a ranking process may be applied to the set of candidate objects, according to some embodiments. The following is an exemplary set of input information that may be used to calculate rankings.

1. Editor Rating: If there is no editor rating for the object, this value is set to a default
2. Community Rating (If there is no community rating for the object, this value can be set to a default)
3. Popularity: Indexed popularity (e.g., number of views) of the object.
4. Change in Popularity: Difference in indexed popularity between current popularity of the object and the object's popularity some time ago
5. Influence: Indexed influence of the object, where the influence of an object is calculated recursively based on the influence of other objects related to the said object, weighted by the degree of relationship to the said object, and where the initial setting of influence of an object is defined as its popularity.
6. Author's Influence: Indexed influence of the highest influence author (based on the sum of the influences of the author's content) of the content referenced by the object
7. Publish Date: Date of publication of the object
8. Selection Sequence Type: An indicator the sequence step in which the candidate object was selected
9. Object Affinity to MTAV: The indexed vector product of the Object-Topic Affinity Vector (OTAV) and the MTAV. The values of the OTAV are just the relevancies between the object and each topic. Here is an example of the OTAV-MTAV vector product.

A ranking is then developed based on applying a mathematical function to some or all or input items listed directly above, and/or other inputs not listed above. In some embodiments, user or administrator-adjustable weighting factors may be applied to the raw input values to tune the object ranking appropriately. These recommendation preference settings may be established directly by the user, and remain persistent across sessions until updated by the user, in some embodiments.

Some example weighting factors that can be applied dynamically by a user or administrator are as follows:

1. Change in Popularity (What's Hot" factor)
2. Recency Factor
3. Object Affinity to MTAV These weighting factors could take any value (but might be typically in the 0-5 range) and could be applied to associated ranking categories to give the category disproportionate weightings versus other categories. They can provide control over how important change in popularity, freshness of content, and an object's affinity with the member's MTAV are in ranking the candidate objects.

The values of the weighting factors are combined with the raw input information associated with an object to generate a rating score for each candidate object. The objects can then be ranked by their scores, and the highest scoring set of X objects, where X is a defined maximum number of recommended objects, can be selected for deliver to a recommendation recipient 200. In some embodiments, scoring thresholds may be set and used in addition to just relative ranking of the candidate objects. The scores of the one or more recommended objects may also be used by the computer-based system 925 to provide to the recommendation recipient a sense of confidence in the recommendation. Higher scores would warrant more confidence in the recommendation of an object than would lower scores.

Recommendation Explanation Generation

In addition to delivering a recommendation 250 for an object, the computer-based application 925 may deliver a corresponding explanation 250c of why the object was recommended. This can be very valuable to the recommendation recipient 200 because it may give the recipient a better sense of whether to bother to read or listen to the recommended content, without committing significant amount of time. For recommendations that comprise advertising content, the explanation may enhance the persuasiveness of the ad.

In some embodiments, variations of the ranking factors may be applied in triggering explanatory phrases. For example, the following table illustrates how the ranking information can be applied to determine both positive and negative factors that can be incorporated within the recommendation explanations. Note that the Ranking Value Range is the indexed attribute values before multiplying by special scaling factors Ranking Category Weighting Factors such as the "What's Hot" factor, etc.

TABLE 2E

| 1 Ranking Category | 2 Ranking Value Range (RVR) | 3 Transformed Range | 4 1st Positive Threshold | 5 2nd Positive Threshold | 6 Negative Threshold |
|---|---|---|---|---|---|
| Editor Rating | 0-100 | RVR | 60 | 80 | 20 |
| Community Rating* | 0-100 | RVR | 70 | 80 | 20 |
| Popularity | 0-100 | RVR | 70 | 80 | 10 |
| Change in Popularity | −100-100 | RVR | 30 | 50 | −30 |
| Object Influence | 0-100 | RVR | 50 | 70 | 5 |
| Author's Influence | 0-100 | RVR | 70 | 80 | .01 |
| Publish Date | −Infinity-0 | 100-RVR | 80 | 90 | 35 |
| Object Affinity to MTAV | 0-100 | RVR | 50 | 70 | 20 |

An exemplary process that can be applied to generate explanations based on positive and negative thresholds listed in 2E is as follows:

Step 1: First Positive Ranking Category—subtract the $1^{st}$ Positive Threshold column from the Transformed Range column and find the maximum number of the resulting vector (may be negative). The associated Ranking Category will be highlighted in the recommendation explanation.

Step 2: Second Positive Ranking Category—subtract the $2^{nd}$ Positive Threshold column from the Transformed Range column and find the maximum number of the resulting vector. If the maximum number is non-negative, and it is not the ranking category we already selected, then include this second ranking category in the recommendation explanation.

Step 3: First Negative Ranking Category—subtract the Negative Threshold column from the Transformed Range column and find the minimum number of the resulting vector. If the minimum number is non-positive this ranking category will be included in the recommendation explanation as a caveat, otherwise there will be no caveats.

Although two positive and one negative thresholds are illustrated in this example, and unlimited number of positive and negative thresholds may be applied as required for best results.

In some embodiments explanations are assembled from component phrases and delivered based on a syntax template or function. Following is an example syntax that guides the assembly of an in-context recommendation explanation. In the syntactical structure below phrases within { } are optional depending on the associated logic and calculations, and "+" means concatenating the text strings. Other detailed syntactical logic such as handling capitalization is not shown in this simple illustrative example.

{[Awareness Phrase (if any)]}+{[Sequence Number Phrase (if any)]+[Positive Conjunction]}+[$1^{st}$ Positive Ranking Category Phrase]+{[Positive Conjunction]+[$2^{nd}$ Positive Ranking Category Phrase (if any)]}+{[Negative Conjunction]+[Negative Ranking Category Phrase (if any)]}+{[Suggestion Phrase (if any)]}

The following section provides some examples of phrase tables or arrays that may be used as a basis for selecting appropriate phrases for a recommendation explanation syntax. Note that in the following tables, when there are multiple phrase choices, they are selected probabilistically. "NULL" means that a blank phrase will be applied. [ ] indicates that this text string is a variable that can take different values.

System Awareness Phrases

| Trigger Condition | Phrase |
|---|---|
| Apply these phrase alternatives if any of the 4 Sequence Numbers was triggered | 1) I noticed that<br>2) I am aware that<br>3) I realized that<br>4) NULL |

Out-of-Context Sequence Number Phrases

| Trigger Condition | Phrase |
|---|---|
| Sequence 1 | 1) other members have related [this object] to [saved object name], which you have saved, |
| Sequence 2 | 1) members with similar interests to you have saved [this object] |
| Sequence 3 | 1) members with similar interests as you have rated [this object]highly<br>2) Members that have similarities with you have found [this object] very useful |

-continued

| Trigger Condition | Phrase |
|---|---|
| Sequence 4 | 1) [this object] is popular with members that have similar interests to yours<br>2) Members that are similar to you have often accessed [this object] |

Positive Ranking Category Phrases

| Trigger Category | Phrase |
|---|---|
| Editor Rating | 1) [it] is rated highly by the editor |
| Community Rating* | 1) [it] is rated highly by other members |
| Popularity** | 1) [it] is very popular |
| Change in Popularity | 1) [it] has been rapidly increasing in popularity |
| Object Influence | 1) [it] is [quite] influential |
| Author's Influence | 1) the author is [quite] influential<br>2) [author name] is a very influential author |
| Publish Date | 1) it is recently published |
| Object Affinity to MTAV (1) | 1) [it] is strongly aligned with your interests<br>2) [it] is related to topics such as [topic name] that you find interesting<br>3) [it] is related to topics in which you have an interest |
| Object Affinity to MTAV (2) | 4) I know you have an interest in [topic name]<br>5) I am aware you have an interest in [topic name]<br>6) I have seen that you are interested in [topic name]<br>7) I have noticed that you have a good deal of interest in [topic name] |

Positive Conjunctions

| Phrase |
|---|
| 1) and |

Negative Ranking Category Phrases

| Trigger Category | Phrase |
|---|---|
| Editor Rating | 1) it is not highly rated by the editor |
| Community Rating | 1) it is not highly rated by other members |
| Popularity | 1) it is not highly popular |
| Change in Popularity | 1) it has been recently decreasing in popularity |
| Object Influence | 1) it is not very influential |
| Author's Influence | 1) the author is not very influential<br>2) [author name] is not a very influential author |
| Publish Date | 1) it was published some time ago<br>2) it was published in [Publish Year] |
| Object Affinity to MTAV | 1) it may be outside your normal area of interest<br>2) I'm not sure it is aligned with your usual interest areas |

Negative Conjunctions

| Phrase |
|---|
| 1) , although<br>2) , however<br>3) , but |

Suggestion Phrases (Use Only if No Caveats in Explanation)

| Phrase |
|---|
| 1) , so I think you will find it relevant |
| 2) , so I think you might find it interesting |
| 3) , so you might want to take a look at it |
| 4) , so it will probably be of interest to you |
| 5) , so it occurred to me that you would find it of interest |
| 6) , so I expect that you will find it thought provoking |
| 7) NULL |

The above phrase array examples are simplified examples to illustrate the approach. In practice, multiple syntax templates, accessing different phrase arrays, with each phrase array many different phrases and phrase variations are required to give the feel of human-like explanations.

As mentioned above, a sense of confidence of the recommendation to the recommendation recipient can also be communicated within the recommendation explanation. The score level may contribute to the confidence level, but some other general factors may be applied, including the amount of usage history available for the recommendation recipient on which to base preference inferences and/or the inferred similarity of the user with one or more other users for which there is a basis for more confident inferences of interests or preferences.

Recommendation explanations are one type of behavioral-based communications 250c that the one or more computer-based applications 925 may deliver to users 200. Other types of adaptive communications 250c may be delivered to a user 200 without necessarily being in conjunction with the recommendation of an object or item of content. For example, a general update of the activities of other users 200 and/or other trends or activities related to people or content may be communicated.

Adaptive communications 250c may also comprise one or more phrases that communicate an awareness of behavioral changes in the user 200 over time, and inferences thereof. These behavioral changes may be derived, at least in part, from an evaluation of changes in the user's MTAV affinity values over time. In some cases, these behavioral patterns may be quite subtle and may otherwise go unnoticed by the user 200 if not pointed out by the computer-based system 925. Furthermore, the one or more computer-based systems may infer changes in interests or preferences of the user 200 based on changes in the user's behaviors over time. The communications 250c of these inferences may therefore provide the user 200 with useful insights into changes in his interest, preferences, and tastes over time. This same approach can also be applied by the one or more computer-based systems to deliver insights into the changes in interests, preferences and tastes associated with any user 200 to another user 200. These insights, packaged in an engaging communications 250c, can simulate what is sometimes referred to as "a theory of mind" in psychology.

The adaptive communications 250c in general may apply a syntactical structure and associated probabilistic phrase arrays to generate the adaptive communications in a manner similar to the approach described above to generate explanations for recommendations. The phrase tendencies of the adaptive communications 250c over a number of generated communications can be said to constitute a "personality" associated with the one or more computer-based applications 925. The next section describes how in some embodiments of the present invention the personality can evolve and adapt over time, based at least in part, on the behaviors of the communication recipients 200.

Adaptive Personalities

Figure 9:
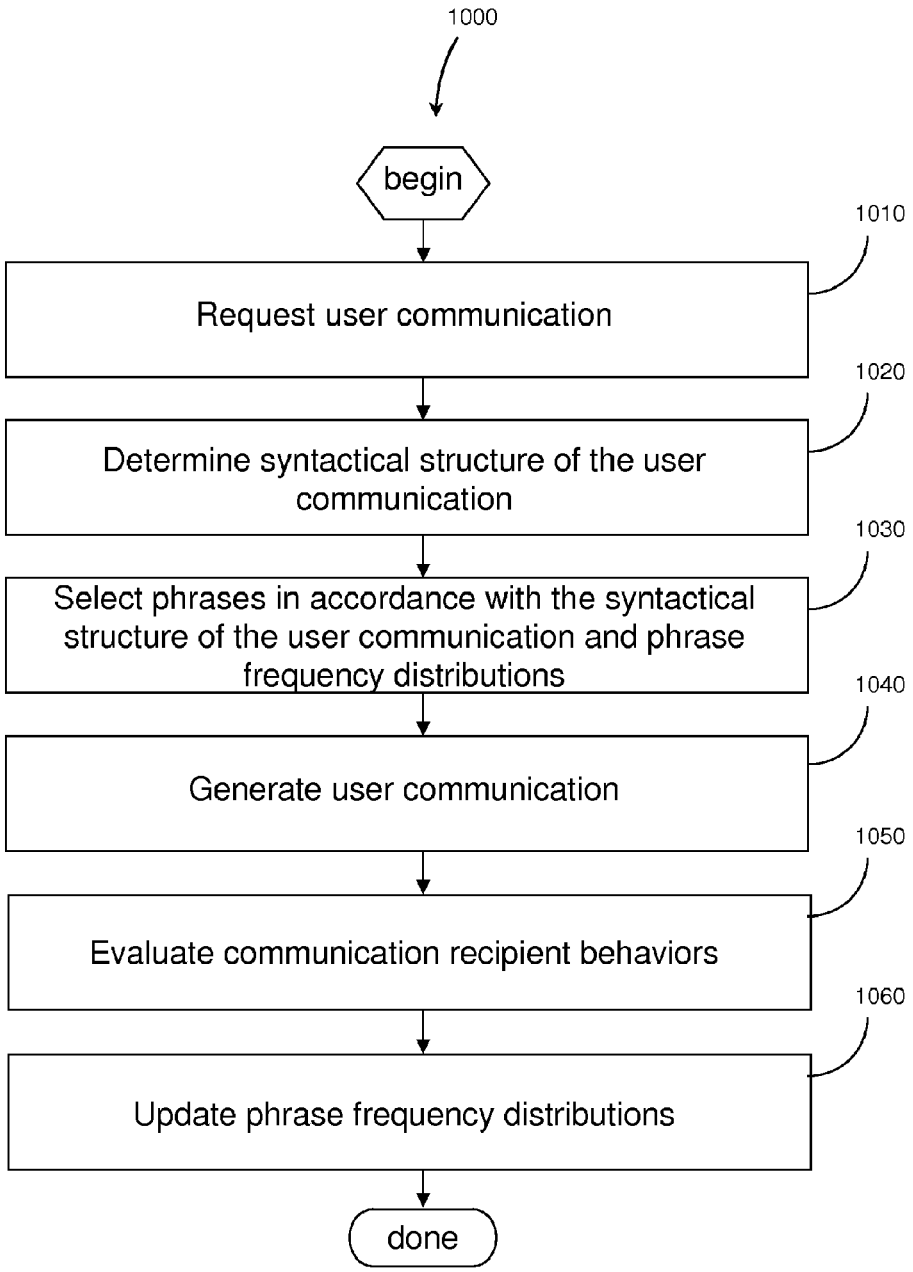
FIG. 9 is a flow diagram of an adaptive personality process, according to some embodiments.

FIG. 9 is a flow diagram of the computer-based adaptive personality process 1000 in accordance with some embodiments of the present invention. A user request for a communication 1010 initiates a function 1020 that determines the syntactical structure of the communication 250c to the user 200. The communication 250c to user 200 may be an adaptive recommendation 250, an explanation associated with a recommendation, or any other type of communication to the user. The communication 250c may be in written format, or may be an audio-based format.

In accordance with the syntactical structure that is determined 1020 for the communication, one or more phrases are probabilistically selected 1030 based on frequency distributions 3030 associated with an ensemble of phrases to generate 1040 a communication 930 to the user.

User behaviors 920, which may include those described by Table 1 herein, are then evaluated 1050 after receipt of the user communication. Based, at least in part, on these evaluations 1050, the frequency distributions 3030 of one or more phrases that may be selected 1030 for future user communications are then updated 1060. For example, if the user communication 250c is an the explanation associated with an adaptive recommendation 250, and it is determined that the recommendation recipient reads the corresponding recommended item of content, then the relative frequency of selection of the one or more phrases comprising the explanation of the adaptive recommendation 250 might be preferentially increased versus other phrases that we not included in the user communication. Alternatively, if the communication 250c elicited one or more behaviors 920 from the communication recipient 200 that were indicative of indifference or a less than positive reaction, then the relative frequency of selection of the one or more phrases comprising the communication might be preferentially decreased versus other phrases that we not included in the user communication.

In FIG. 11, an illustrative data structure 3000 supporting the adaptive personality process 1000 according to some embodiments is shown. The data structure may include a designator for a specific phrase array 3010. A phrase array may correspond to a specific unit of the syntax of an overall user communication. Each phrase array may contain one or more phrases 3040, indicated by a specific phrase ID 3020. Associated with each phrase 3040 is a selection frequency distribution indicator 3030. In the illustrative data structure 3000 this selection frequency distribution of phrases 3040 in a phrase array 3010 is based on the relative magnitude of the value of the frequency distribution indicator. In other embodiments, other ways to provide selection frequency distributions may be applied. For example, phrases 3040 may be selected per a uniform distribution across phrase instances in a phrase array 3010, and duplication of phrase instances may be used to as a means to adjust selection frequencies.

Communication of Self-Awareness

Figure 10:
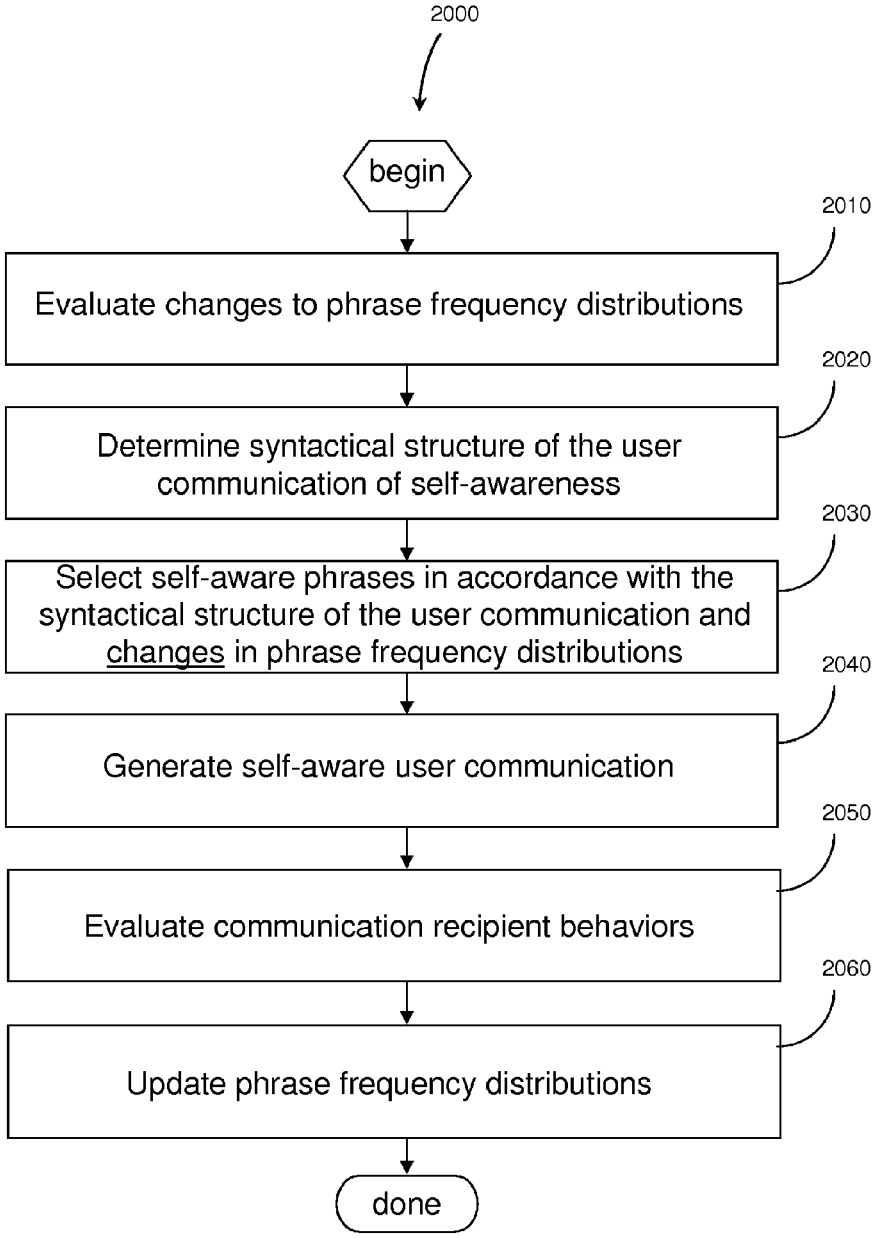
FIG. 10 is a flow diagram of a self-aware personality process, according to some embodiments.

FIG. 10 is a flow diagram of the computer-based adaptive self-awareness communication process 2000 in accordance with some embodiments of the present invention. The process 2000 begins with an evaluation 2010 of phrase frequency distribution 3030 changes over time. Then the appropriate syntactical structure of the communication 250c of self-awareness is determined 2020. One or more phrases 3040 that embody a sense of self-awareness are then selected in accordance with the syntactical structure requirements and changes in phrase frequency distributions over time.

Returning to FIG. 11, in some embodiments, phrase attributes that are associated with specific phrases may be used as a basis for self-aware phrase selection. Two example phrase attributes 3050, 3060 whose values are associated with specific phrases 3040 are shown. An unlimited number of attributes could be used as to provide as nuanced a level of self-awareness as desired.

When changes in phrase frequency distributions 3030 are evaluated 2010, the corresponding attributes 3050, 3060 are also evaluated. These attributes map to attributes 4050, 4060 that are associated with self-aware phrases 4040 in self-aware phrase data structure 4000. For example, if phrases 3040 that have the attribute value "humorous" have been increasing in frequency, then self-aware phrases that reference "humorous" may be appropriate to include in generating 2040 a communication of self-awareness 250c to a user 200. As is the case of any other communication 250c, the behaviors 920 of the recipient 200 of the communication may be evaluated 2050, and the self-aware phrase frequency distributions 4030 of the self-aware phrases 4040 may be updated 2060 accordingly. This recursive evaluation and updating of phrase frequency distributions can be applied without limit.

Figure 12:
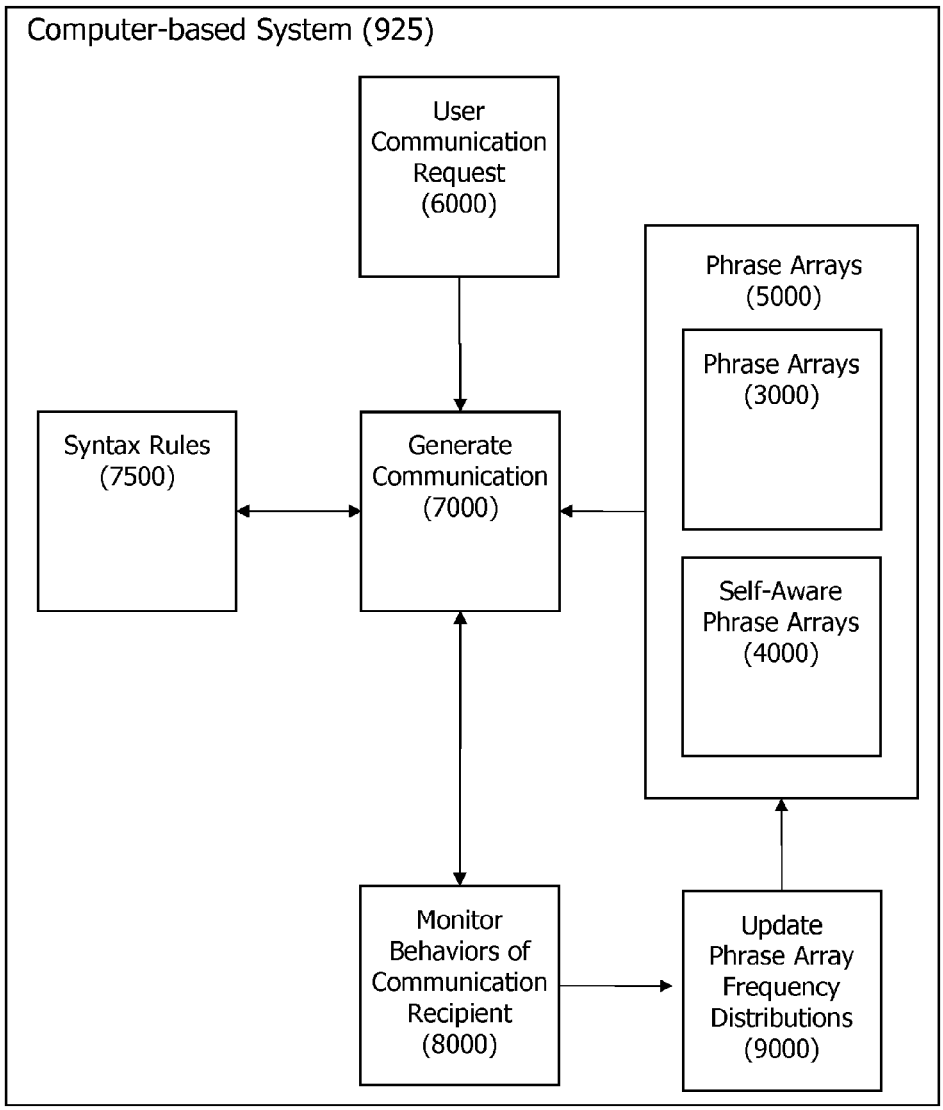
FIG. 12 is a block diagram of major functions of an adaptive personality and self-aware personality system, according to some embodiments.

FIG. 12 depicts the major functions associated with a computer based system 925 that exhibits an adaptive personality, and optionally, a self-aware personality. Recall that in some embodiments, the computer-based system 925 comprises an adaptive system 100.

A request 6000 for a communication to a user 200 is made. The request 6000 may be a direct request from a user 200, or the request may be made by another function of the computer-based system 925. In some embodiments the request 6000 for a communication to the user may be initiated by a function that generates 240 an adaptive recommendation. A communication to the user is then generated 7000. This generation is done by first determining the appropriate syntactical rules or structure 7500 for the communication. In some embodiments, the syntax rules 7500 are of an "If some condition, Then apply a specific phrase array 3010" structure. Once the appropriate syntax is established and associated phrase arrays 3010 are determined, specific phrases are probabilistically retrieved from the phrase array function 5000 based on selection frequency distributions associated with the corresponding phrase arrays. The communication 250c is then assembled and delivered to a user 200.

User behaviors 920 of the communication recipient 200 are then monitored 8000. Based on inferences from these behaviors 920, the phrase array frequency distributions of the phrase array function 5000 are updated 9000 appropriately.

Computing Infrastructure

Figure 13:
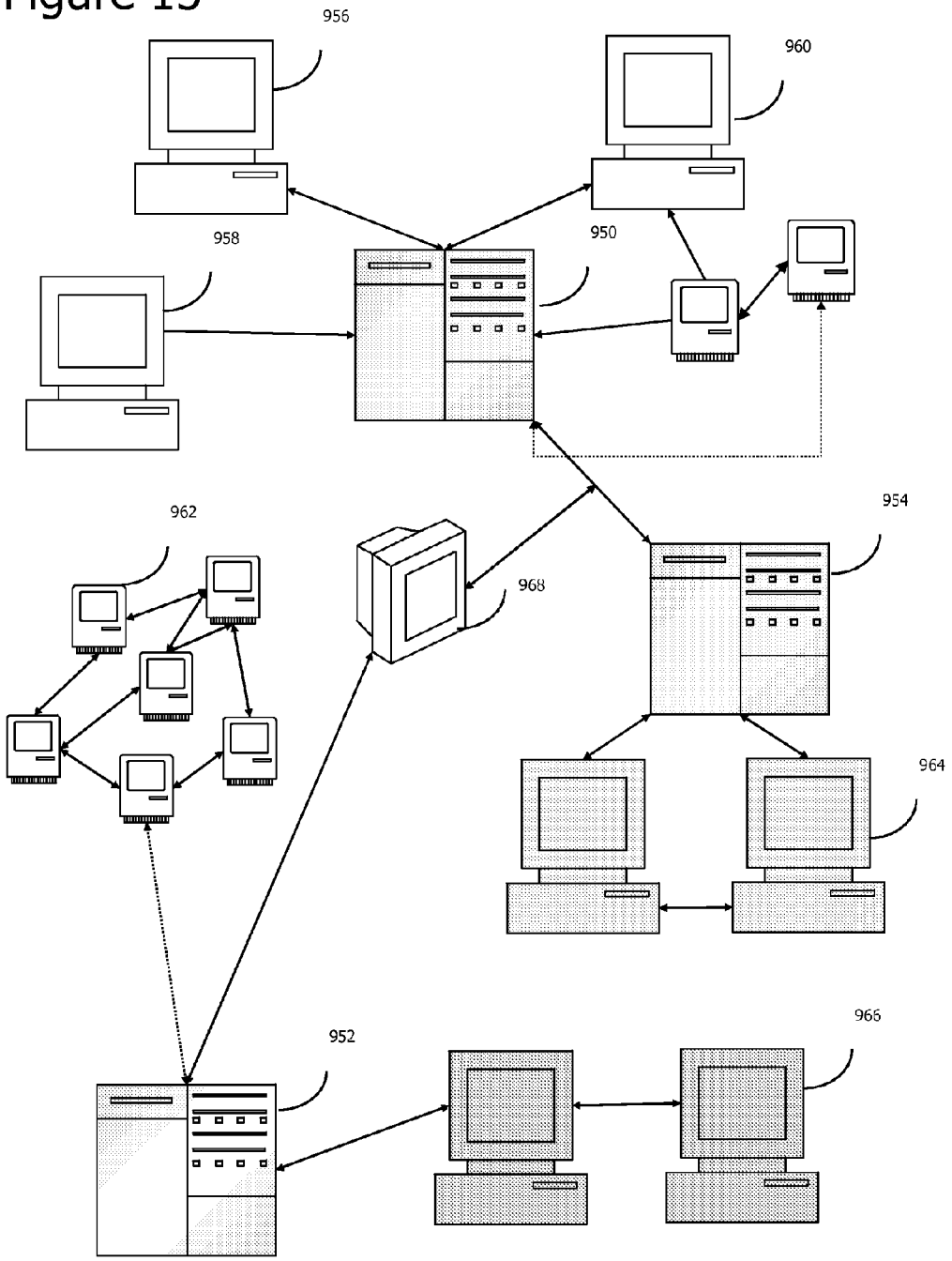
FIG. 13 is a diagram of various computing device topologies, according to some embodiments.

FIG. 13 depicts various computer hardware and network topologies on which the one or more computer-based applications 925 may operate.

Servers 950, 952, and 954 are shown, perhaps residing at different physical locations, and potentially belonging to different organizations or individuals. A standard PC workstation 956 is connected to the server in a contemporary fashion, potentially through the Internet. It should be understood that the workstation 956 can represent any computer-based device, mobile or fixed, including a set-top box. In this instance, the one or more computer-based applications 925, in part or as a whole, may reside on the server 950, but may be accessed by the workstation 956. A terminal or display-only device 958 and a workstation setup 960 are also shown. The PC workstation 956 or servers 950 may be connected to a portable processing device (not shown), such as a mobile telephony device, which may be a mobile phone or a personal digital assistant (PDA). The mobile telephony device or PDA may, in turn, be connected to another wireless device such as a telephone or a GPS receiver.

FIG. 13 also features a network of wireless or other portable devices 962. The one or more computer-based applications 925 may reside, in part or as a whole, on all of the devices 962, periodically or continuously communicating with the central server 952, as required. A workstation 964 connected in a peer-to-peer fashion with a plurality of other computers is also shown. In this computing topology, the one or more computer-based applications 925, as a whole or in part, may reside on each of the peer computers 964.

Computing system 966 represents a PC or other computing system, which connects through a gateway or other host in order to access the server 952 on which the one or more computer-based applications 925, in part or as a whole, reside. An appliance 968, includes software "hardwired" into a physical device, or may utilize software running on another system that does not itself the one or more computer-based applications 925. The appliance 968 is able to access a computing system that hosts an instance of one of the relevant systems, such as the server 952, and is able to interact with the instance of the system.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A computer-based recommendation method comprising:

generating an affinity vector between a first user of a computer-based system and a plurality of computer-based objects based, at least in part, on the first user's behaviors;

generating a similarity metric between the first user and a second user of the computer-based system based, at least in part, on the affinity vector of the first user and an affinity vector of the second user;

generating a recommendation for delivery to the first user based, at least in part, on the affinity vector of the first user and the similarity metric; and generating an explanation for the recommendation comprising one or more phrases, wherein the selection of the one or more phrases is based, at least in part, on a plurality of user behaviors and in accordance with a computer-implemented syntactical structure.

2. The method of claim 1 wherein generating an affinity vector between a first user of a computer-based system and a plurality of computer-based objects based, at least in part, on the first user's behaviors comprises:

generating affinities between the user and a plurality of topic objects.

3. The method of claim 1 wherein generating a recommendation for delivery to the first user based, at least in part, on the affinity vector of the first user and the similarity metric comprises:

recommending the second user to the first user.

4. The method of claim 1 wherein generating a recommendation for delivery to the first user based, at least in part, on the affinity vector of the first user and the similarity metric comprises:

generating a recommendation responsive to [the] *a* user's search request.

5. The method of claim 1 wherein generating a recommendation for delivery to the first user based, at least in part, on the affinity vector of the first user and the similarity metric comprises:

generating a recommendation based on a recommendation preference setting [established by] *associated with* the user.

6. The method of claim 1 wherein generating an explanation for the recommendation comprising one or more phrases, wherein the selection of the one or more phrases is based, at least in part, on a plurality of user behaviors and in accordance with a computer-implemented syntactical structure comprises:

selecting phrases for inclusion in the explanation based on a frequency distribution.

7. The method of claim 1 wherein generating an explanation for the recommendation comprising one or more phrases, wherein the selection of the one or more phrases is based, at least in part, on a plurality of user behaviors and in accordance with a computer-implemented syntactical structure comprises:

selecting phrases for inclusion in the explanation in accordance with the calculated confidence level of the recommendation.

8. A computer-based recommendation system comprising:

means to generate an affinity vector between a first user of a computer-based system and a plurality of computer-based objects based, at least in part, on the first user's behaviors;

means to generate a similarity metric between the first user and a second user of the computer-based system based, at least in part, on the affinity vector of the first user and an affinity vector of the second user;

means to generate a recommendation for delivery to the first user based, at least in part, on the affinity vector of the first user and the similarity metric; and means to generate an explanation for the recommendation comprising one or more phrases, wherein the selection of the one or more phrases is based, at least in part, on a plurality of user behaviors and in accordance with a computer-implemented syntactical structure.

9. The system of claim 8 wherein means to generate an affinity vector between a first user of a computer-based system and a plurality of computer-based objects based, at least in part, on the first user's behaviors comprises:

means to generate affinities between the user and a plurality of topic objects.

10. The system of claim 8 wherein means to generate a recommendation for delivery to the first user based, at least in part, on the affinity vector of the first user and the similarity metric comprises:

means to recommend the second user to the first user.

11. The system of claim 8 wherein means to generate a recommendation for delivery to the first user based, at least in part, on the affinity vector of the first user and the similarity metric comprises:

means to generate a recommendation responsive to [the] *a* user's search request.

12. The system of claim 8 wherein means to generate a recommendation for delivery to the first user based, at least in part, on the affinity vector of the first user and the similarity metric comprises:

means for generating a recommendation based on a recommendation preference setting [established by] *associated with* the user.

13. The system of claim 8 wherein means to generate an explanation for the recommendation comprising one or more phrases, wherein the selection of the one or more phrases is based, at least in part, on a plurality of user behaviors and in accordance with a computer-implemented syntactical structure comprises:

means to select phrases for inclusion in the explanation based on a frequency distribution.

14. The system of claim 8 wherein means to generate an explanation for the recommendation comprising one or more phrases, wherein the selection of the one or more phrases is based, at least in part, on a plurality of user behaviors and in accordance with a computer-implemented syntactical structure comprises:

means to select phrases for inclusion in the explanation in accordance with the calculated confidence level of the recommendation.

15. A computer-based recommendation explanation system comprising:

means to generate a recommendation based, at least in part, on a plurality of usage behaviors;

a syntactical structure for an explanation [of an associated] *for the* recommendation;

a plurality of phrase arrays associated with the syntactical structure, wherein each phrase array comprises a plurality of phrases;

a mapping of usage behaviors and corresponding phrase arrays [appropriate to apply]; and means to generate [an] *the* explanation for the recommendation, wherein the explanation is generated in accordance with the syntactical structure and associated phrase arrays, and the mapping of usage behaviors with the corresponding phrase arrays [appropriate to apply].

16. The system of claim 15 wherein *the* means to generate an explanation for the recommendation, wherein the explanation is generated in accordance with the syntactical structure and associated phrase arrays, and the mapping of usage behaviors with the corresponding phrase arrays [appropriate to apply] comprises:

means to probabilistically select from alternative syntactical structures.

17. The system of claim 15 wherein *the* means to generate an explanation for the recommendation, wherein the explanation is generated in accordance with the syntactical structure and associated phrase arrays, and the mapping of usage behaviors with the corresponding phrase arrays [appropriate to apply] comprises:

means to select phrases from a frequency distribution for inclusion in the explanation.

18. The system of claim 15 wherein *the* means to generate an explanation for the recommendation, wherein the explanation is generated in accordance with the syntactical structure and associated phrase arrays, and the mapping of usage behaviors with the corresponding phrase arrays [appropriate to apply] comprises:

means to apply behavioral thresholds to trigger [appropriate] phrase arrays.

19. The system of claim 15 wherein *the* means to generate an explanation for the recommendation, wherein the explanation is generated in accordance with the syntactical structure and associated phrase arrays, and the mapping of usage behaviors with the corresponding phrase arrays [appropriate to apply] comprises:

means to adjust the selection of phrases for inclusion in the explanation based on the phrase composition of previously generated explanations.

20. The system of claim 15 wherein *the* means to generate an explanation for the recommendation, wherein the explanation is generated in accordance with the syntactical structure and associated phrase arrays, and the mapping of usage behaviors with the corresponding phrase arrays [appropriate to apply] comprises:

means to adjust the selection of phrases for inclusion in the explanation based on usage behaviors of recipients of previously generated explanations.

*21. A method comprising:*

*generating, by a processing device, a recommendation of a computer-based object for delivery to a first user of a computer-based system based on first user behavior associated with a plurality of computer-based objects; and*

*generating, by the processing device, an explanation for the recommendation comprising one or more phrases based on a plurality of other user behaviors and in accordance with a computer-implemented syntactical structure.*

*22. The method of claim 21, further comprising,*

*generating, by the processing device, a first affinity vector associated with the first user based on the first user behavior associated with the plurality of computer-based objects;*

*generating, by the processing device, a similarity metric between the first user and a second user of the computer-based system based on the first affinity vector and a second affinity vector associated with the second user;*

*wherein, the generating the recommendation is based on the first affinity vector and the similarity metric.*

*23. The method of claim 22 wherein the second affinity vector is based on the second user behavior associated with the plurality of computer-based objects.*

*24. The method of claim 22 wherein the second affinity vector is based on the second user behavior associated with a different plurality of computer-based objects.*

*25. The method of claim 22 wherein the generating the affinity vector further comprises generating, by the processing device, affinities between the user and a plurality of topic objects.*

*26. The method of claim 22 wherein the recommendation further comprises recommending the second user to the first user.*

*27. The method of claim 21 wherein the recommendation is responsive to a search request associated with the first user.*

*28. The method of claim 21 wherein the recommendation is based on a recommendation preference setting associated with the first user.*

*29. The method of claim 21 wherein the generating the explanation further comprises selecting, by the processing device, phrases for inclusion in the explanation based on a frequency distribution.*

*30. The method of claim 21 the generating the explanation further comprises selecting, by the processing device, phrases for inclusion in the explanation in accordance with the calculated confidence level of the recommendation.*

*31. An apparatus comprising:*

*means for generating a recommendation of a computer-based object for delivery to a first user of a computer-based system based on first user behavior associated with a plurality of computer-based objects; and*

*means for generating an explanation for the recommendation comprising one or more phrases based on a plurality of other user behaviors and in accordance with a computer-implemented syntactical structure.*

*32. The apparatus of claim 31, further comprising,*

*means for generating a first affinity vector associated with the first user based on the first user behavior associated with the plurality of computer-based objects;*

*means for generating a similarity metric between the first user and a second user of the computer-based system based on the first affinity vector and a second affinity vector associated with the second user;*

*wherein, the generating the recommendation is based on the first affinity vector and the similarity metric.*

*33. The apparatus of claim 32 wherein the second affinity vector is based on the second user behavior associated with the plurality of computer-based objects.*

*34. The apparatus of claim 32 wherein the second affinity vector is based on the second user behavior associated with a different plurality of computer-based objects.*

*35. The apparatus of claim 32 wherein the means for generating the affinity vector further comprises means for generating affinities between the user and a plurality of topic objects.*

*36. The apparatus of claim 31 wherein the recommendation further comprises recommending the second user to the first user.*

*37. The apparatus of claim 31 wherein the recommendation is responsive to a search request associated with the first user.*

*38. The apparatus of claim 31 wherein the recommendation is based on a recommendation preference setting associated with the first user.*

*39. The apparatus of claim 31 wherein the means for generating the explanation further comprises means for selecting phrases for inclusion in the explanation based on a frequency distribution.*

*40. The apparatus of claim 31 wherein the means for generating the explanation further comprises means for selecting phrases for inclusion in the explanation in accordance with the calculated confidence level of the recommendation.*

*41. An apparatus, comprising:*

*computer hardware configured to:*

*store instructions associated with an application program; and*

*execute the stored instructions to:*

*generate a recommendation based, at least in part, on a plurality of usage behaviors;*

*associate a plurality of phrase arrays with a syntactical structure;*

*map the plurality of usage behaviors and corresponding phrase arrays selected from the plurality of phrase arrays; and*

*generate an explanation for the recommendation based on the map, the explanation comprising a phrase associated with one of the corresponding phase arrays in accordance with the syntactical structure.*

*42. The apparatus of claim 41, wherein the corresponding phrase array comprises a plurality of phrases.*

*43. The apparatus of claim 41 wherein the computer hardware is further configured to select alternative syntactical structures based on probabilistic determination to generate the explanation.*

*44. The apparatus of claim 41 wherein the computer hardware is further configured to select the phrase from a frequency distribution for inclusion to generate the explanation.*

*45. The apparatus of claim 41 wherein the computer hardware is further configured to apply behavioral thresholds to map the plurality of usage behaviors and corresponding phrase arrays selected from the plurality of phrase arrays.*

*46. The apparatus of claim 41 wherein the computer hardware is further configured to adjust the selection of the phrase for inclusion in the explanation based on the phrase composition of previously generated explanations.*

*47. The apparatus of claim 41 wherein the computer hardware is further configured to adjust the selection of the phrase for inclusion in the explanation based on usage behaviors of recipients of previously generated explanations.*

*48. Computer hardware having instructions stored thereon that, in response to execution by a processing device, cause the processing device to perform operations comprising:*

*generating a recommendation based, at least in part, on a plurality of usage behaviors;*

*associating a plurality of phrase arrays with a syntactical structure;*

*mapping the plurality of usage behaviors and corresponding phrase arrays selected from the plurality of phrase arrays; and*

*generating an explanation for the recommendation based on the map, the explanation comprising a phrase associated with one of the corresponding phase arrays in accordance with the syntactical structure.*

*49. The computer-readable-memory device of claim 48, wherein the corresponding phrase array comprises a plurality of phrases.*

*50. The computer hardware of claim 48 wherein the operations further comprise selecting alternative syntactical structures based on probabilistic determination to generate the explanation.*

*51. The computer hardware of claim 48 wherein the operations further comprise selecting the phrase from a frequency distribution for inclusion to generate the explanation.*

*52. The computer hardware of claim 48 wherein the operations further comprise applying behavioral thresholds to map the plurality of usage behaviors and corresponding phrase arrays selected from the plurality of phrase arrays.*

*53. The computer hardware of claim 48 wherein the operations further comprise adjusting the selection of the phrase for inclusion in the explanation based on the phrase composition of previously generated explanations.*

*54. The computer hardware of claim 49 wherein the operations further comprise adjusting the selection of the phrase for inclusion in the explanation based on usage behaviors of recipients of previously generated explanations.*

* * * * *